(12) United States Patent
Oliver et al.

(10) Patent No.: US 11,894,663 B2
(45) Date of Patent: Feb. 6, 2024

(54) DEVICE AND METHODS FOR REPLACING OR REPAIRING A POWER TRANSMISSION LINE SUPPORT STRUCTURE

(71) Applicant: ANDERSON & WOOD CONSTRUCTION CO., INC., Meridian, ID (US)

(72) Inventors: Chase C Oliver, Meridian, ID (US); Fred S Oliver, Eagle, ID (US); Devin Bruett, Meridian, ID (US)

(73) Assignee: Anderson & Wood Construction Co., Inc., Meridian, ID (US)

( * ) Notice: Subject to any disclaimer, the term of this patent is extended or adjusted under 35 U.S.C. 154(b) by 297 days.

(21) Appl. No.: 17/497,975

(22) Filed: Oct. 10, 2021

(65) Prior Publication Data
US 2023/0114733 A1   Apr. 13, 2023

(51) Int. Cl.
*H02G 1/02*   (2006.01)

(52) U.S. Cl.
CPC ..................... *H02G 1/02* (2013.01)

(58) Field of Classification Search
CPC .. H02G 7/20; H02G 7/00; H02G 7/05; H02G 1/02; H02G 1/04
See application file for complete search history.

(56) References Cited

U.S. PATENT DOCUMENTS

| | | |
|---|---|---|
| 3,911,548 A | 10/1975 | Perry |
| 4,371,018 A | 2/1983 | Arnold |
| 4,697,959 A * | 10/1987 | Kinnan ............... E04H 12/2292 52/514 |
| 5,538,207 A * | 7/1996 | O'Connell ............... H02G 1/04 182/2.11 |
| 11,749,978 B1 * | 9/2023 | Lindquist ................ H02G 1/04 294/174 |
| 2005/0247015 A1 | 11/2005 | Baumgartner |
| 2009/0169309 A1 * | 7/2009 | Kwon .................... E02D 27/42 405/232 |

(Continued)

FOREIGN PATENT DOCUMENTS

| | | |
|---|---|---|
| JP | 5322708 B2 | 10/2013 |
| WO | 2009/084778 A1 | 7/2009 |

*Primary Examiner* — Hoa C Nguyen
*Assistant Examiner* — Amol H Patel
(74) *Attorney, Agent, or Firm* — Pedersen & Company, PLLC; Ken J. Pedersen; Barbara S. Pedersen

(57) ABSTRACT

A winch column holds electric power conductors and static lines separate and distanced from an existing power line pole/structure during repair or replacement of the pole/structure. The winch column is temporarily anchored and stabilized to be vertical and adjacent to the existing pole/structure, and winch cables extend from the winch column height-adjustable frame to support the load of the disconnected conductors. Hoist lines also extend from the frame to support the disconnected static lines. After the repair or replacement of the pole/structure, the conductors and static lines are moved, and reconnected, to the new pole, and the winch column may be moved to another existing pole or power line or folded for storage. Whenever the winch cables handle the conductors, tension sensors provided on the frame are used to monitor and report conductor tension, for safe and effective handling and reinstallation on the new pole.

21 Claims, 38 Drawing Sheets

(56) References Cited

U.S. PATENT DOCUMENTS

2009/0245994 A1* 10/2009 Ritola .................... E04H 12/34
  414/816
2023/0187913 A1*  6/2023 Grant, Jr. ................ H02G 1/04
  254/134.3 R

* cited by examiner

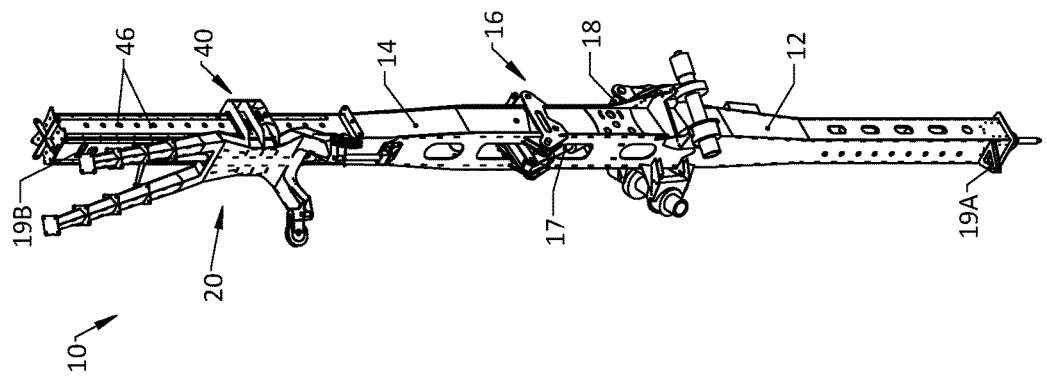
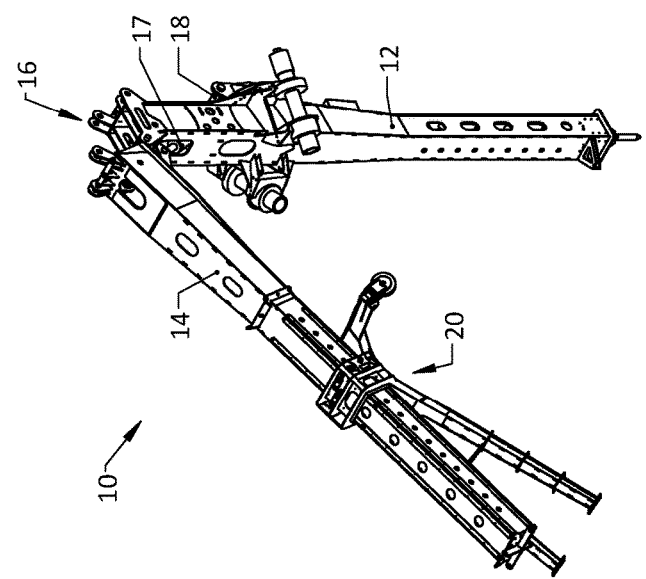
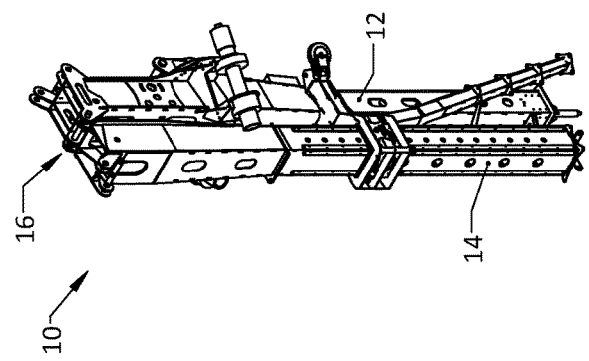

DEVICE AND METHODS FOR REPLACING OR REPAIRING A POWER TRANSMISSION LINE SUPPORT STRUCTURE

BACKGROUND

Field of the Disclosed Technology

The invention relates to equipment and/or methods for work on electric power transmission line systems, for example, for replacing or repairing the power line support structure. The invention may be used to facilitate labor savings, improve safety of the working environment, and/or reduce power line outage time.

Related Art

Power transmission systems conventionally comprise a system of poles or other support structures for electric power lines (also, "conductors") and shield-overhead ground wires (also, "static lines"), which poles or other support structures may be of various shapes and complexities, as is well known and summarized at https://en.wikipedia.org/wiki/Overhead_power_line; https://en.wikipedia.org/wiki/Utilitypole; and https://en.wikipedia.org/wiki/Transmission_tower. While the poles and other support structures may not be a "simple" pole, that is a single elongated, cylindrical upright post or shaft, the term "pole" is used herein for simplicity, to include said simple poles and also towers and other complex upright support structures.

Conventional methods of handling power transmission lines, when a pole or other support structure needs to be replaced or repaired, require the transfer the loads of electrical power conductor(s) and static lines to another power transmission pole/structure, for example, to the "adjacent pole" next to the "existing pole" that is to be replaced/repaired. This is typically done via ground-based winches that must be placed a distance from the existing pole that is a minimum of 4 times the height of the conductor(s)' location on the existing pole, to eliminate overstressing the existing pole. For example, this approach of load transfer typically requires four ground-based winches placed a minimum of 200 feet in each direction from the existing pole, in order to transfer the load and tension/strain to the adjacent pole, and then, in reverse, to transfer the load and tension/strain to the replaced/repaired pole.

For example, in conventional methods, a first winch line runs from a first ground-based winch-truck through a first sheave placed at the height of the conductor connector attachment point on the existing pole/structure, wherein said placement of the first sheave is accomplished by personnel working from an aerial personnel lift or by a line person working from the pole or structure. The end of the first winch line is attached to the conductor using a conductor grip at said end, for example, by a person in a portable elevated aerial personnel lift along-side the existing pole or by a line person working from the pole or structure. A second winch line runs from a second ground-based winch truck up through a second sheave placed at/near the adjacent pole, wherein said placement of the second sheave is accomplished by personnel working from an aerial personnel lift or by a line person working from the pole or structure. The end of the second winch line is attached to the same conductor to which the first winch line is attached, by means of a second conductor grip placed further out on the conductor (further away from the existing pole) compared to the first winch line, again by a person working from a portable elevated aerial personnel lift along-side said "further-out" location on the conductor. The load/tension of the conductor then is first taken-up by the first winch line (reeling-in the first winch line), to allow for detaching of the conductor from the existing pole. Then, after detaching the conductor from the existing pole, the first winch begins to release the conductor load (letting-out first winch line) while the second winch simultaneously begins to take-up the conductor load (reeling-in the second winch line), thus continuing to support the conductor while transferring the conductor and its load to the adjacent pole. Therefore, in these conventional methods, the conductor and each winch line are typically supported temporarily by the respective sheave. However, for example, if the winches are needed to transfer the conductor going the other direction from the pole, then personnel would temporarily catch the conductor off in hoists and grips on the pole to relieve the winches from duty. Or, if the line is going to be left in this position overnight in an accessible area, then personnel might catch it off in the hoists on the pole to eliminate the opportunity for ground-based vandalism. These conventional methods and equipment for handling conductors are typically also used for handling static lines that are typically at the top of power transmission poles/structures.

Other devices or methods for handling power transmission conductors/lines, when a pole/structure needs to be replaced or repaired are shown in the patent literature, as follows:

a) U.S. Pat. No. 3,911,548A, entitled Method for Replacing Existing Utility Pole without Disturbing Hardware Mounted Thereon, regarding splicing or coupling the original/existing top section of a pole to a new bottom pole section, for example, at the failure point of the original/existing pole;

b) U.S. Pat. No. 4,371,018A, Device for Repairing Poles for Supporting Electric Power Transmission Lines and the Like, regarding coupling a pole to a pole stub;

c) WO2009084778A1, Uninterrupted Replacement Method of Concrete Utility Pole for Distribution Line Using Pole Clamp and Pole Crusher, regarding concrete pole coupling, and utilizing measurement of force on the concrete pole instead of tension on the line; and d) US Patent Publication 2005/0247015, Method and Apparatus for Replacing a Utility Pole.

These patent documents focus on splicing/coupling a new pole portion to an existing pole portion, for example, at or near a pole failure point, and/or are specially adapted for a single type of pole such as a concrete pole or an H-frame structure. The equipment and methods of these patents do not allow Applicant's efficient and safe methods of handling conductors and static lines while replacing the entire pole/structure, and are not universally effective with most or all conventional power line support pole/structures.

SUMMARY

The invention comprises equipment and/or methods for working on power transmission systems or "power lines", for example, for replacing or repairing structural components of the power lines, for example poles or other support structures (herein, for simplicity "pole" or "poles"). The equipment and/or method may be described as comprising a winch column device (or simply, "winch column") that is temporarily anchored and stabilized in a vertical position adjacent to an existing power transmission line pole, the winch column comprising winch cables that attach to and support the existing pole's electrical conductor(s) to allow disconnection of the conductor(s) from the existing pole, after which the embodiments lift and hold the disconnected conductor(s) in a position adjacent to, but separate from, the existing pole while the existing pole is replaced or repaired, all with appropriate conductor tension maintained. The winch column preferably also comprises multiple connections for static line(s) lifted and held adjacent to, but separate from, the existing pole, during said existing pole replacement or repair. After the replacement or repair, certain embodiments allow replacement of the conductor(s) on the new pole, again with appropriate conductor tension maintained, and also replacement of the static line(s) on the new pole. A single one of said winch columns may be used for handling and support of one or more, and preferably all, of the conductors of a single pole, and, at the same time, for handling and support of one or more, and preferably all, of the static lines of said single pole. Also, in certain embodiments, a single one of said winch columns may be used for simultaneous handling and support of one or more, and preferably all, of the conductors of multiple poles of a pole assembly, and for simultaneous handling and support of one or more, and preferably all, of the static lines of said multiple poles of the pole assembly.

The winch column is placed adjacent to a to-be-repaired or to-be-replaced pole (hereafter called the "existing pole" or "original pole" for simplicity), preferably by a vehicle such as an excavator that stays connected to the winch column during use and is large and heavy enough to stabilize the winch column. Winch cables extending from winches provided on the winch column connect to the conductor(s) of the power transmission system, and hoist lines extending from the winch column connect to the static line(s) of the power transmission system, prior to disconnection of said conductor(s) and static line(s). Then, upon disconnection of the conductor(s) and static line(s) from the existing pole, the winch systems and hoist lines move the conductor(s) and static line(s), respectively, away from the existing pole and support the conductor(s) and static line(s) in a location closely adjacent to, and at substantially the same height-above-ground as, the conductor(s)' and static line(s)' previous locations on said existing pole. While moving and supporting the conductor(s), the winch systems measure and maintain appropriate tension stress (or, herein, "tension" or "tension load") of the conductor(s). Upon replacement or repair of the existing pole, the winch column is used to assist reinstallation of the conductor(s) and static line(s) on the replaced/repaired pole/structure (the "new pole"). During said reinstallation, the winch systems can be monitored by the electronic load sensors in the load pins, the readings/data from which are displayed on the remote control system monitor and adjust if needed, the tension on the conductor(s) to maintain the same or substantially the same tension on the reinstalled conductors as was present when they were supported by the original pole or to maintain tension at the required specifications. After said reinstallation, the winch cables and hoist lines are detached from the conductor(s) and static line(s), and the winch column may be moved to another pole/structure of the same power line for the same or similar replacement or repair process, for example, by the excavator or other vehicle that has stabilized the winch column during use. When the process is complete for all the pole(s) of the power line that need replacement or repair, the winch column may be placed on a truck bed or trailer for transport to other power lines for said process or for transport to storage. Therefore, preferred embodiments comprise the winch column being temporarily, rather than permanently, placed near each existing pole to be replaced or repaired.

Compared to conventional equipment and methods, the invented equipment and/or methods improve the speed and safety of power line structural component replacement or repair, and reduce power line outage time, which improvements typically benefit base rate and customer satisfaction. Such benefits may be especially important for power transmission structural components that are complex and/or in remote locations or difficult environments.

Certain embodiments of the winch column and/or methods include adaptations for providing one, multiple, or all of the following features/actions: folding the winch column to reduce the device length for transport and storage; connection of the winch column to a vehicle such as an excavator for carrying, placing, stabilizing, powering with hydraulic and electric power for winch column hydraulic and electrical requirements, including electrical power for the self-contained pneumatic system built into the winch column, and then removing the device from its temporary in-use position; winch column extension and retraction for accommodating different pole-heights and conductor-locations; winch column pivoting relative to said vehicle carrying or holding the winch column in its in-use position, to accommodate various terrains such as sloped ground; temporary anchoring of the winch column by use of a bottom-column-end stabilizing member that can be pushed into the ground; supplementing anchoring of the winch column by use of guying points on the winch column that allow for attaching temporary down-guys for directional support; multiple winches with winch cables/lines (hereafter "winch cables") that connect to multiple conductors or to multiple portions of a single conductor; a frame at an upper end of the device that is adapted to carry/direct winch cables; the frame comprising the winch cable sheaves; the frame being raisable and lowerable for placing the sheaves and winch cables at various heights about the ground appropriate for effective capturing and manipulation of the conductors by the winch cables; sensor(s) to measure the tension that each conductor is under whenever the winch cable(s) support the conductor(s), for example, prior to disconnection of the conductor(s) from the existing pole as the winch cables are taking up the conductor load, after disconnection of the conductor(s) from the existing pole as the winch cables are supporting and holding the conductor(s) separate from and away from the existing pole, and during reinstallation of the conductor(s) onto the new pole; and/or remote control of one, multiple, or all of the features/actions of this paragraph, preferably with remote control readings, data, and/or settings displayed on a remote control system monitor. By providing a winch column system and process adapted for multiple or all of these features/actions, manhours are greatly reduced, for example to one-third of the manhours required for conventional methods, and the quality of the work is improved or at least equal to conventional methods. Further, the preferred winch column system and preferred process improve safety for reasons comprising personnel being distant from the winch column, existing pole, and conductors in most or all steps of the process, as the preferred winch column system is controlled by use of portable radio remote control. These and/or alternative features/actions, objects, and benefits will be apparent upon review of the drawings and the following description and claims.

BRIEF DESCRIPTION OF THE DRAWINGS

FIG. 1 is a perspective view of one embodiment of the invented winch column in a folded configuration that places the upper and lower portions (or upper and lower beams) of the main body of the winch column beside, or "side-by-side" with each other.

FIG. 2 is a perspective view of the winch column of FIG. 1, partially unfolded,

FIG. 3 is a front perspective view of the winch column of FIG. 1, fully unfolded to be vertical and to place the head rig or "frame" at the top of the winch column.

FIG. 40A is an enlarged detail view of the branched winch cable extending from the left winch sheave of the winch column and controlled by the left winch of the winch column, for handling and supporting two of the three existing poles' conductors.

FIG. 40B is an enlarged detail view of a portion of the right winch cable extending near and across a portion of the branched left winch cable, which right winch cable is for handling and supporting the third conductor.

FIG. 40C is an enlarged detail view of hoist assemblies connected at one end to the two substantially upright arms of the winch column and connected at the opposite end to the static lines of two of the three existing poles.

DETAILED DESCRIPTION OF CERTAIN EMBODIMENTS

Figure 4:
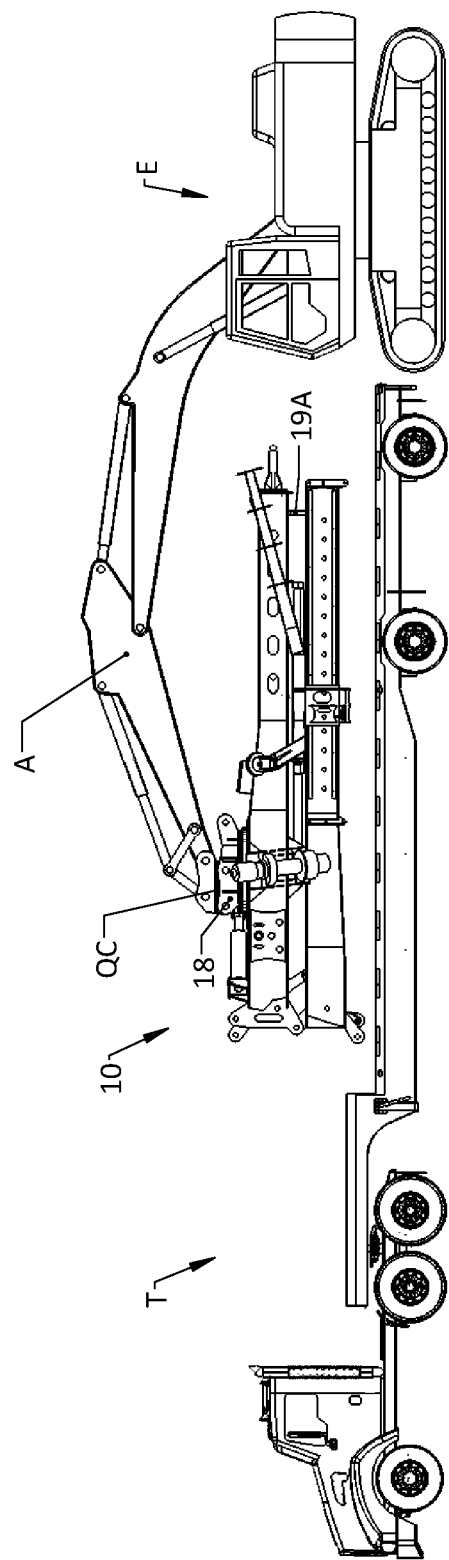
FIG. 4 is a side view of the folded winch column of FIG. 1 being lifted from a truck bed or trailer by an excavator that is quick-connected to the winch column.

The figures show several, but not the only, embodiments of the disclosed equipment and methods, which includes an integrated mechanism used in processes for removing conductor loads from an existing pole (as stated above, "pole" meaning a simple pole or other various support structures used in power transmission systems to support electrical conductors), and temporarily supporting the conductors in both directions simultaneously as the conductors extend in both directions from the pole.

The main use for the preferred embodiments will be on transmission power lines, which are typically removed from service ("taken down" or "de-energized") to reduce danger and process complexity when completing pole/structure repair or replacement, due to the high voltages of transmission power lines typically ranging from 69 kV up to 345 kV (kV being thousand volts). Therefore, the preferred embodiments of the device may be uninsulated, or only partly insulated (for example, including rope or other non-electrically-conductive winch cables/connections). Given that performing the repair or replacement work with conventional equipment and methods would require transmission power lines to be removed from service, the many benefits and improvements provided by the present invention/device result in the transmission line outage time that is required to complete the work being substantially reduced compared to conventional equipment and methods.

Alternatively, certain embodiments may be used with energized lines, for example energized transmission lines, or energized distribution lines (which operate at much lower voltages, from 5 kV to 35 kV, and often remain energized during work), as long as modifications to set-up and connections are made to keep proper clearances between conductive portions and to have all connections to the conductors or other conductive portions being non-electrically-conductive.

The preferred equipment/methods feature a winch column that is temporarily employed at the site of a given existing pole to be replaced or repaired, the use of which improves worker safety and productivity by supporting the conductors in place, providing accurate tension measurements, and allowing workers to remain a safe distance from all moving parts and conductors during the process. Height of the winch column is adjusted by lowering a lower extension of the winch column main body, and/or by raising or lowering a top frame relative to the main body of the winch column, so that winch lines extending from the frame can be effectively connected to the conductors to "capture" the conductors, for subsequent handling and supporting of the conductors. After capture of the conductors and throughout the process, tension stresses may be adjusted by winch uptake. Once captured by the winch system, the conductors of the existing pole are disconnected by personnel at or near the existing pole (the "disconnected conductors"), tension monitoring is continued and further winch uptake or let-out may be used to pull the conductors away from the existing pole and to further adjust the position and tension of the conductors as needed. Once the existing pole is replaced or repaired (providing the "new pole"), personnel may guide the conductors back to rest on the new pole while remote controlling the winches to lengthen the winch cables, thus releasing the load from the winch cables and transferring the load (and hence the tension stress) back to the new pole permanent structure. Then, personnel may attach/connect the conductors to the new pole and detach the winch cables from the conductors. The winch column may also be used for handling and supporting the static lines (shield/overhead ground wires) of the existing pole by connection of the static lines, typically by connecting the static lines to the winch column by means of manual hoists, which is possible due to the much-lower tension typically on the static lines. The winch column functions are preferably entirely or substantially done by hydraulically and/or pneumatically, via portable radio remote controller.

Therefore, it may be said that the preferred winch systems are mounted on and controlled by a single column device and its associated remote control, to connect winch lines to the conductors in-situ, that is, "capturing" the conductors while they are in their original, in-use positions on the original pole. The winch control systems provide real-time read-out, viewable from the remote controller, of the force on the conductors as the winch systems support the conductors and/or take-up their cables to move the disconnected conductors. This equipment and method permit fewer winches and manual hoists to be deployed and to be operated by fewer people, reducing or eliminating equipment and process complexity compared to conventional equipment and pole replacement or repair. For example, certain embodiments reduce or eliminate both the need to use cranes to hold conductors or static wires (shield/overhead ground wires), and the need for ground-based winch trucks and their winch lines that are typically drug out for several hundred feet in two directions from the ground-based winch trucks.

In certain embodiments, the transfer of the conductors is accomplished by connection of winch lines to the conductors while the conductors are still in their original location on the existing pole, and then adjusting the height of the frame and/or the winch lines tension to orient the winch lines and angle(s) and to tighten the winch lines until the winch lines support the conductors' weight/tension. Then, the winch-line-supported conductors may be disconnected from the existing pole by personnel, and the winch lines may be operated to move the conductors several feet away from the existing pole, but still at generally the same height above the ground. This may be accomplished by continued winch take-up to pull the conductors to the new, adjacent position supported by the winch column rather than supported by the existing pole/structure and rather than any adjacent power line pole and rather than any crane. Throughout this process, the tension sensor (also known as a "load pin") of each winch sheave monitors the tension on the conductor(s) held by the respective winch line.

Therefore, the winch column and methods are suitable for simultaneously handling and supporting conductors and the associated large load and resulting tension stress of the conductors and the static lines that are typically higher on the existing pole but with much-lower associated load and tension stress, on many or all poles/structures currently used in power transmission lines and those envisioned for the future, including but not limited to dead-end, dead-end angle, and running angle poles/structures. Certain embodiments are also suitable for processing comprising cutting into a conductor for sleeving purposes, and/or holding/supporting the conductor in one or both directions (extending one direction from the pole/structure) while releasing or increasing tension on either conductor in a different or opposing direction relative to the pole/structure. The winch column and methods effectively handling and manipulate conductors or other lines for replacement/repair of one pole/structure at a time, or, in certain embodiments, the winch column and methods can effectively handle and support conductors or other lines for multiple poles/structures at the same time with the same winch column placement, for example, all three poles of a running angle structure. See FIGS. 39-42. This multiple-pole process may be done by gripping ("capturing") the conductor (or likewise, the static line) all across the angle (outer line) and using an "evener block" (see sheave 32LX in FIG. 40) to lift the other two conductors after installing a sling through the evener block and attaching grips to the two interior conductors. This approach generally triples the savings in labor and is not possible in conventional methods due to the mechanical limitations described in the Related Art section.

Referring Specially to FIGS. 1-25

FIGS. 1-3 show an embodiment of the winch column 10, in three positions comprising a folded position (FIG. 1) that is used for transport and storage, an unfolding position (FIG. 2), and a fully unfolded position (FIG. 3) wherein the winch column may be in the range of 55-85 feet tall, for example. FIGS. 1-3 illustrate the two main portions of the main body of the winch column 10, namely, the lower beam 12 and the upper beam 14 that pivot relative to each other at the main body hinge 16 as remote-controlled by a hydraulic cylinder 17. Said pivoting and the hinge 16 allow the column 10 to fold in half, and then to fully unfold to place the frame 20 at or near the top end of the column 10. A lock may be provided to lock the upper and lower main beam together when folded, for example, the lock comprising a lock protrusion 19A (FIGS. 3-7, and 9) on the lower beam 12 and a lock recess 19B near the top of the upper beam 14 (FIG. 3), which are locked together by a remote-control pneumatically actuated pin (not shown) inside the upper beam.

Figure 5:
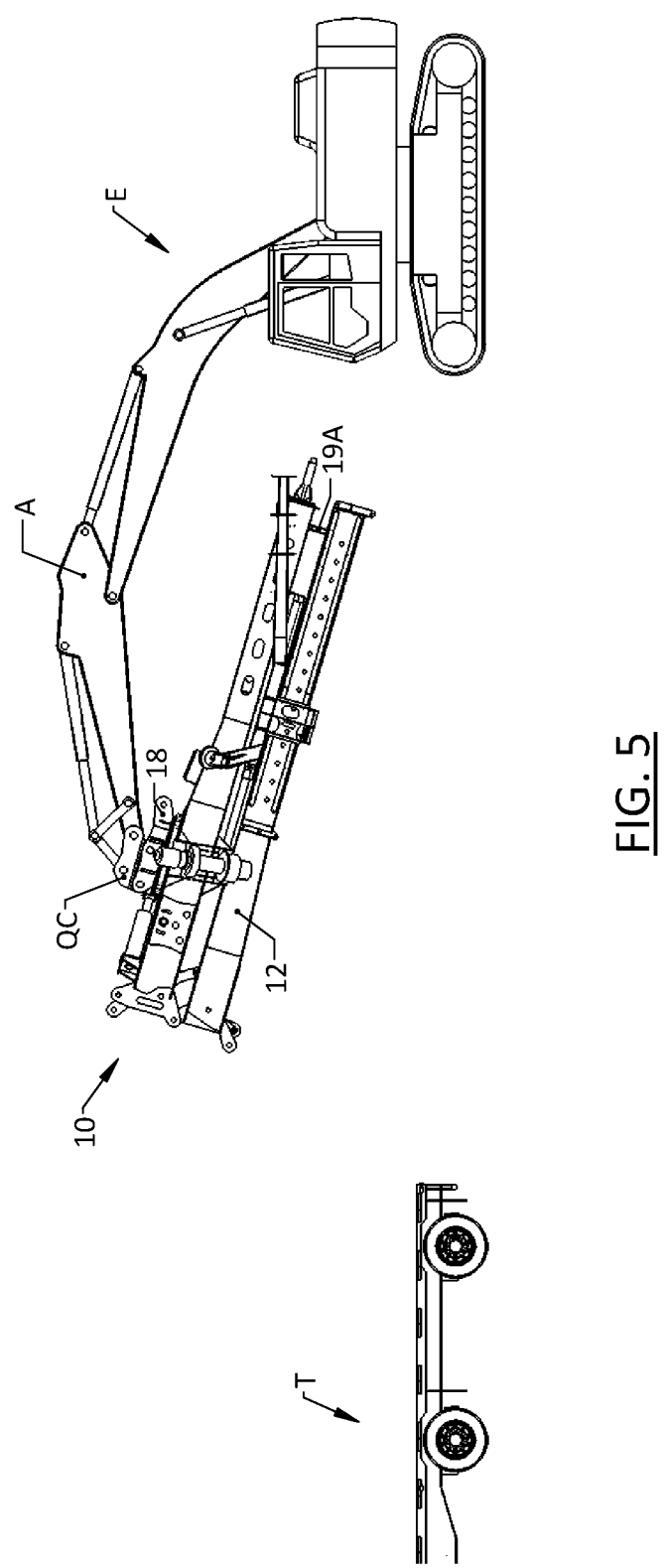
FIG. 5 is a side view of the winch column of FIG. 1 being lifted further away from the truck bed of FIG. 4.

FIGS. 4 and 5 show the folded column 10 being lifted from the trailer-bed of a tractor-trailer or other transport vehicle T. In certain embodiments, the column 10 is adapted for connection to a large excavator E, for example, by a quick-connect coupler 18 on a side of the lower beam 12 that connects to a conventional excavator quick-connect coupler (QC in FIGS. 4-7), at the end of the arm A of an excavator E, such as is conventionally used to connect an earth-moving bucket to the excavator.

Figure 6:
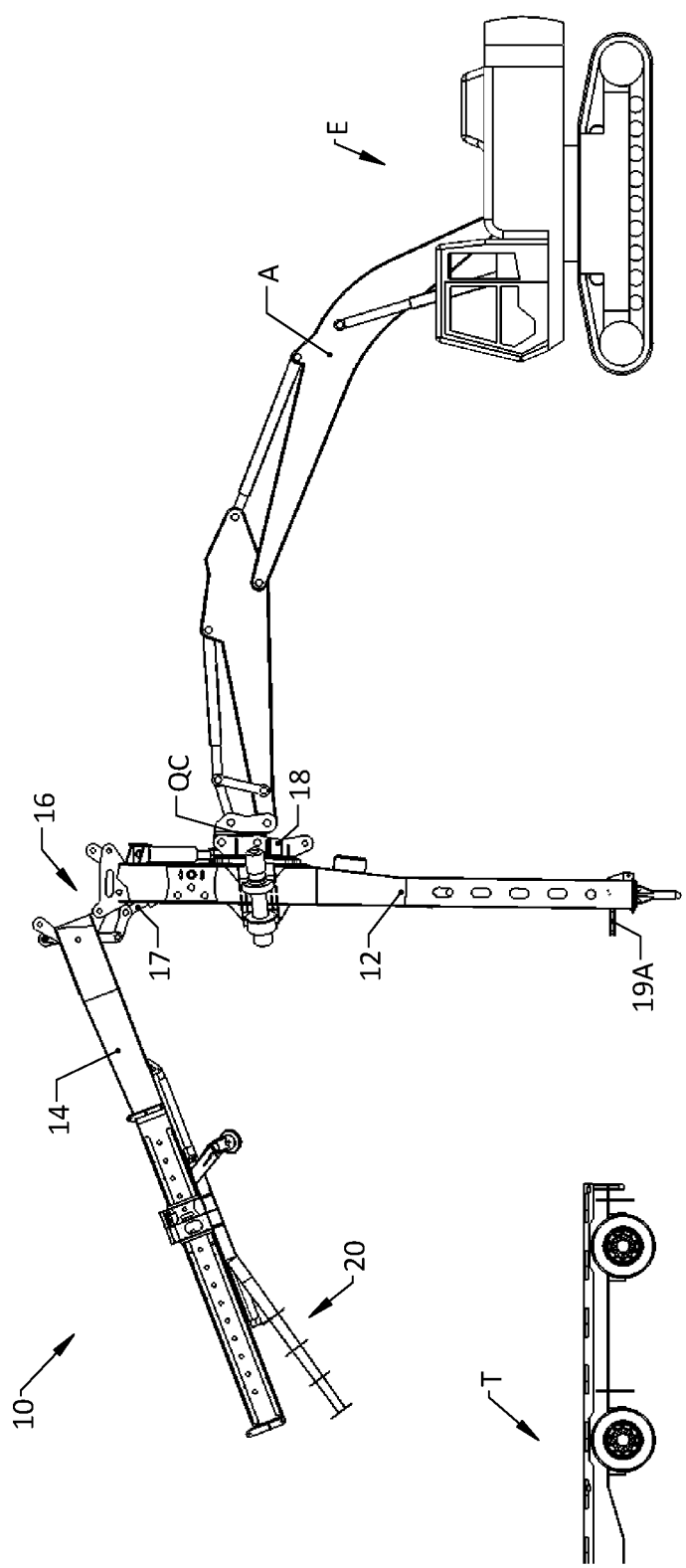
FIG. 6 is a side view of the excavator of FIG. 4 further lifting the unfolding winch column of FIG. 1.
Figure 7:
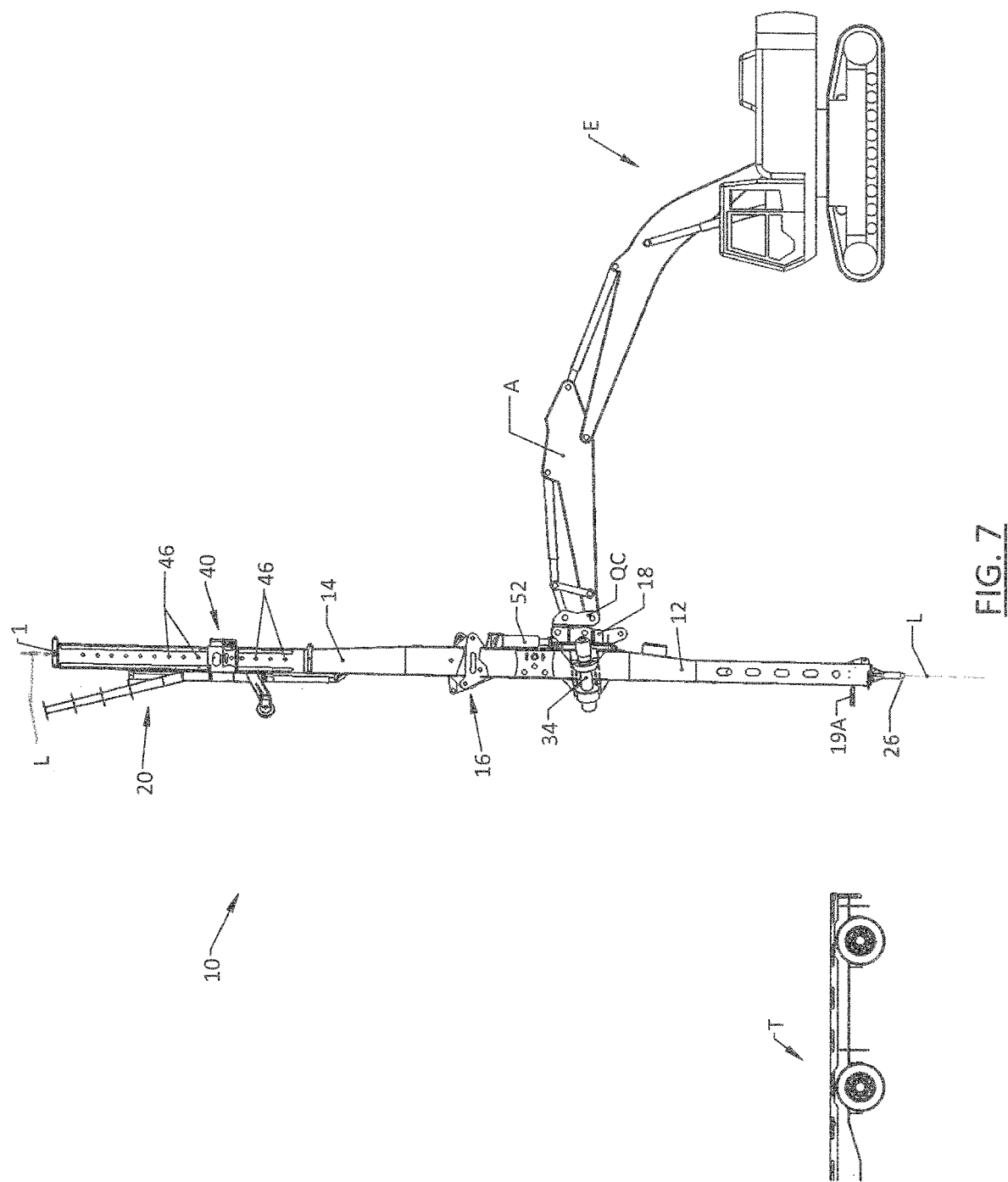
FIG. 7 is a side view of the winch column held by the excavator as in FIG. 6, but with the winch column fully unfolded to the vertical configuration of FIG. 3 except with the frame raised to be about midway between its fully lowered and fully raised positions.

FIGS. 6 and 7 show the excavator E holding the lower beam 12 vertically, while the upper beam 14 pivots upward (FIG. 6) to unfold the column 10 to a fully-vertical position (FIG. 7) that places the upper beam 14 above, parallel, and coaxial with the lower beam 12 and the extension 22 with a pointed spike 26 (FIGS. 8, 9, 11, 12 and 15-17, discussed later in this document), and that places the height-adjustable frame 20 generally at the top of the column 10. The longitudinal axis L of the winch pole 10 is shown in FIG. 7, which extends between the top end 1 (FIG. 7) and the spike 26 (FIG. 7). Typically, the excavator E drives the column 10 toward the existing pole with the column already unfolded, to reduce or eliminate the chance that the unfolding column will impact any existing portion of the power transmission system. The excavator places the column 10 adjacent to an existing pole, for example 2 to 12 feet or preferably 3 to 8 feet from, the existing pole and facing the existing pole, for deployment and use in the process.

Deploying the column 10 preferably comprises adjusting the height of the column 10, anchoring the column adjacent to the existing power pole or other power-line system structure ("the existing pole"), and adjusting the location of the frame 20 on the upper beam 14 of the column 10, and attaching any necessary directional guys and anchors to support the column against imposed line tension loads. These actions secure the column 10 for safe use, and place the frame 20 at an optimum level for access to the conductor(s) and line(s) on the existing pole in processes that will be further described later in this document. FIG. 3 show the unfolded winch column 10 retracted to its shortest overall length (frame 20 lowered and lower extension 22 retracted), FIG. 7 shows the unfolded winch column 10 partially extended (frame 20 raised partway up the upper beam and lower extension 22 still retracted), and FIGS. 8 and 15-19 show the unfolded column 10 fully extended to its greatest overall length (the frame 20 fully raised and lower extension 22 fully lowered).

Figure 8:
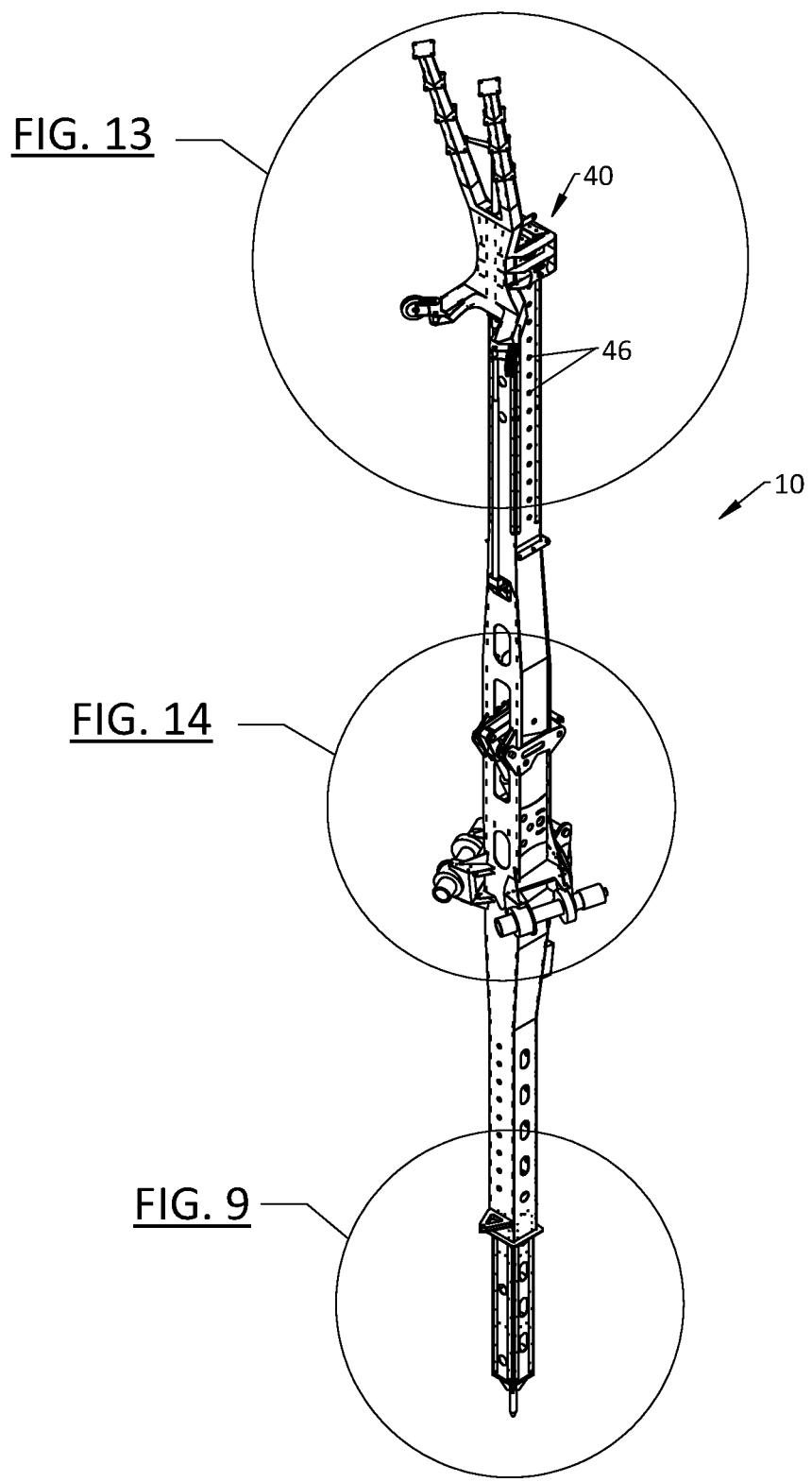
FIG. 8 is a front perspective view of the fully unfolded winch column, with the frame on the upper beam of the winch column raised to its fully raised position and with the lower extension that slides down from the lower beam of the winch column lowered to its fully lowered position.
Figure 9:
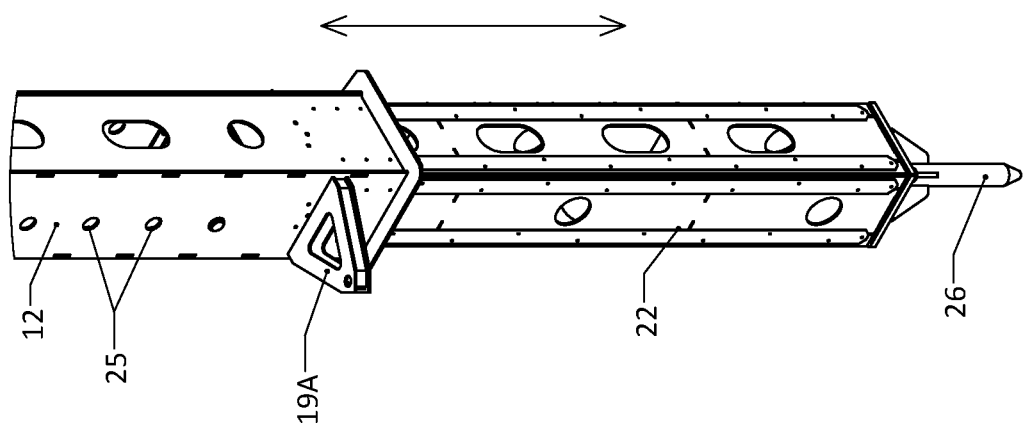
FIG. 9 is an enlarged detail, front view of the portion of the lower end of the winch column that is circled and labeled "FIG. 9" in FIG. 8, illustrating that the lower extension may slide/telescope down from the lower beam of the winch column.
Figure 20:
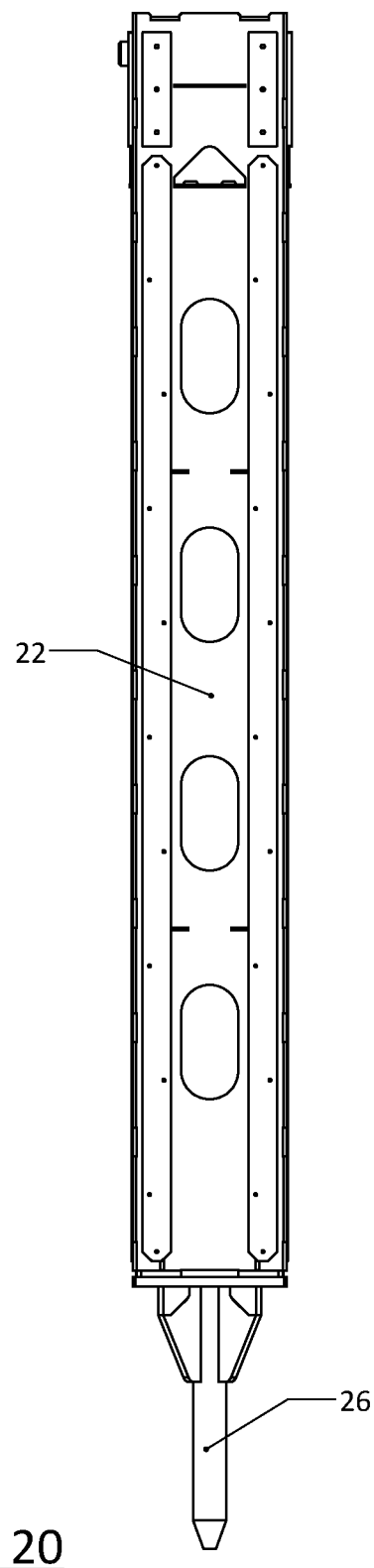
FIG. 20 is a front view of the lower extension of the winch column shown in FIG. 8, removed from the lower beam of the winch column.
Figure 21:
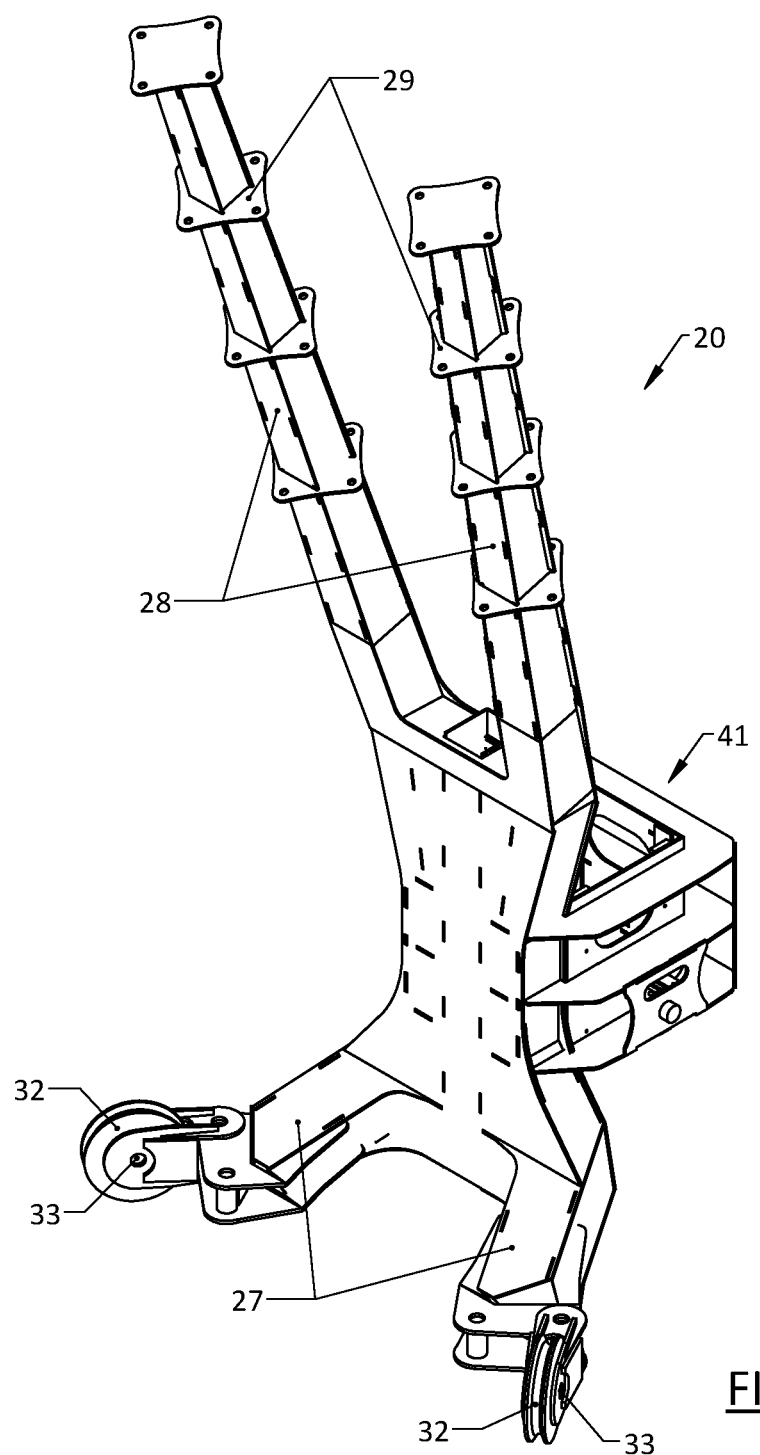
FIG. 21 is a front perspective view of the frame of the winch column shown in FIG. 8, removed from the upper beam of the winch column, wherein the structure that holds the pneumatic cylinder, for locking and unlocking the frame in position relative to the upper beam, is visible at the rear side of the frame.
Figure 22:
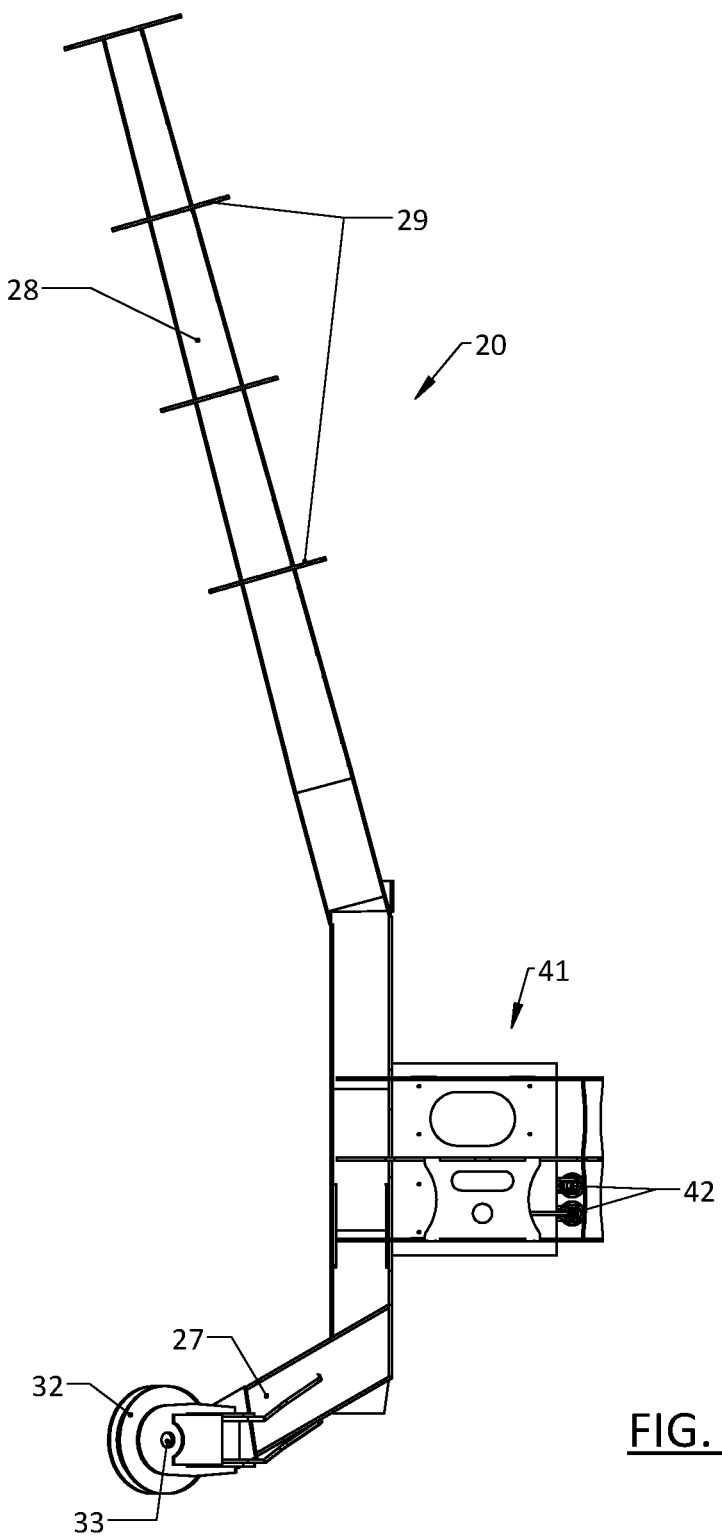
FIG. 22 is a left side view of the frame of FIG. 21, wherein the pneumatic cylinders are visible in/on the cage.
Figure 23:
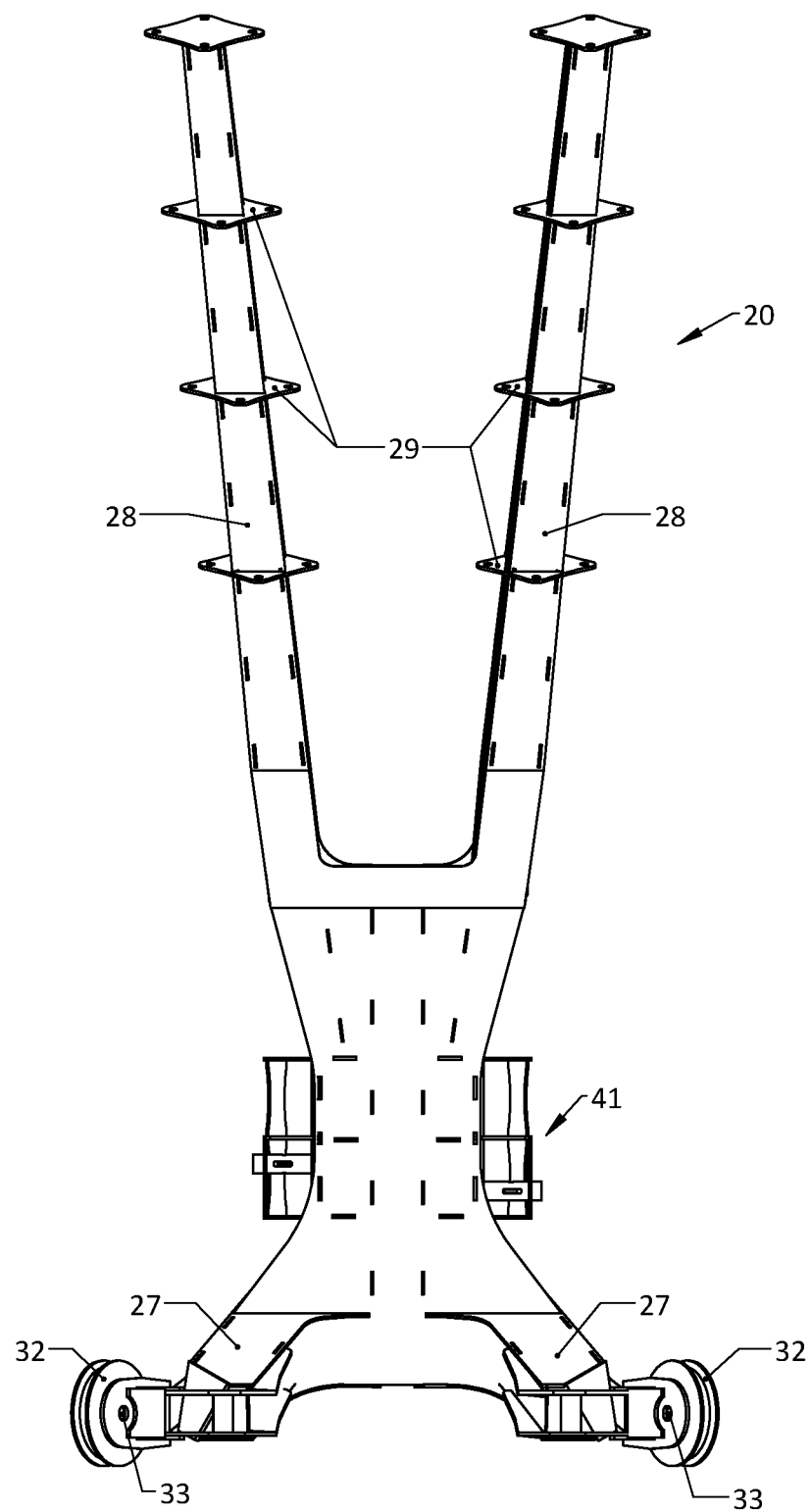
FIG. 23 is a front view of the frame of FIG. 21.
Figure 24:
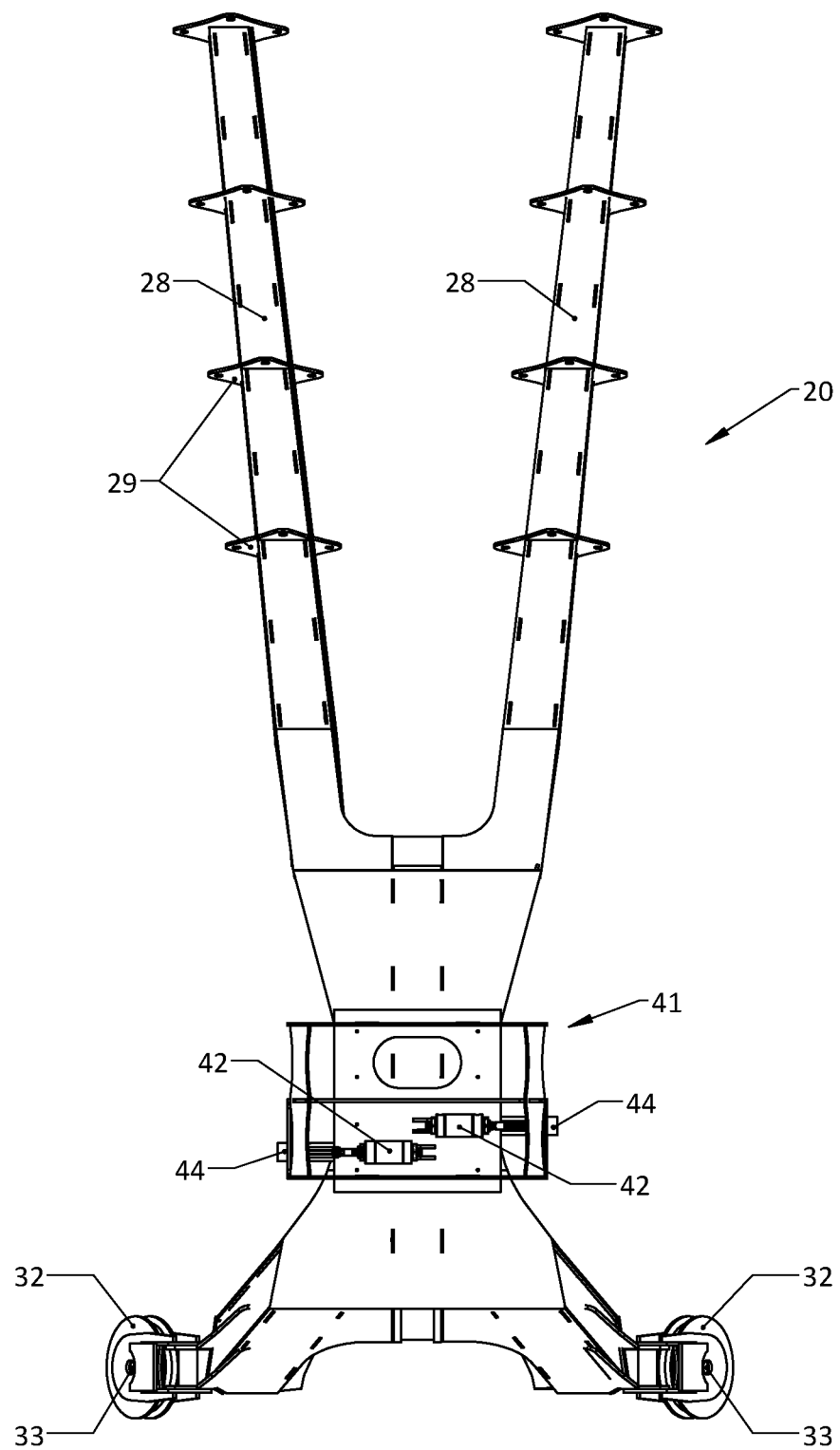
FIG. 24 is a rear view of the frame of FIG. 21, wherein the structure at the lower rear of the frame shows the preferred embodiment with the pneumatic cylinders and their pins, wherein the pins are driven to enter apertures in the upper beam to lock the frame at various heights on the upper beam, and the pins are retracted from the apertures to unlock the frame from the upper beam.

As illustrated in FIGS. 8 and 9, the lower beam 12 comprises the elongated lower extension 22 with spike 26 that is slidably received inside the lower beam 12 so that the extension 22 telescopes in and out from the beam 12. The extension 22 is lockable in a retracted position inside the beam 12 and also in positions that are incrementally extended from the beam 12. By unlocking the extension 22 when the lower beam 12 is in a vertical position as shown in FIG. 6 or 7 and raising the column a desired amount by means of the excavator arm A, the extension 22 will slide downward by the force of gravity to rest on/hit the ground G, whereupon the extension 22 may be relocked in this desired position relative to the beam 12. Thus, the adjusted length of the lower beam (beam 12 with extension 22) serves to adjust the total length of the main body (12, 22, and 14). FIG. 20 shows the extension 22 with spike 26 removed and separate from the lower beam 12.

Figure 10:
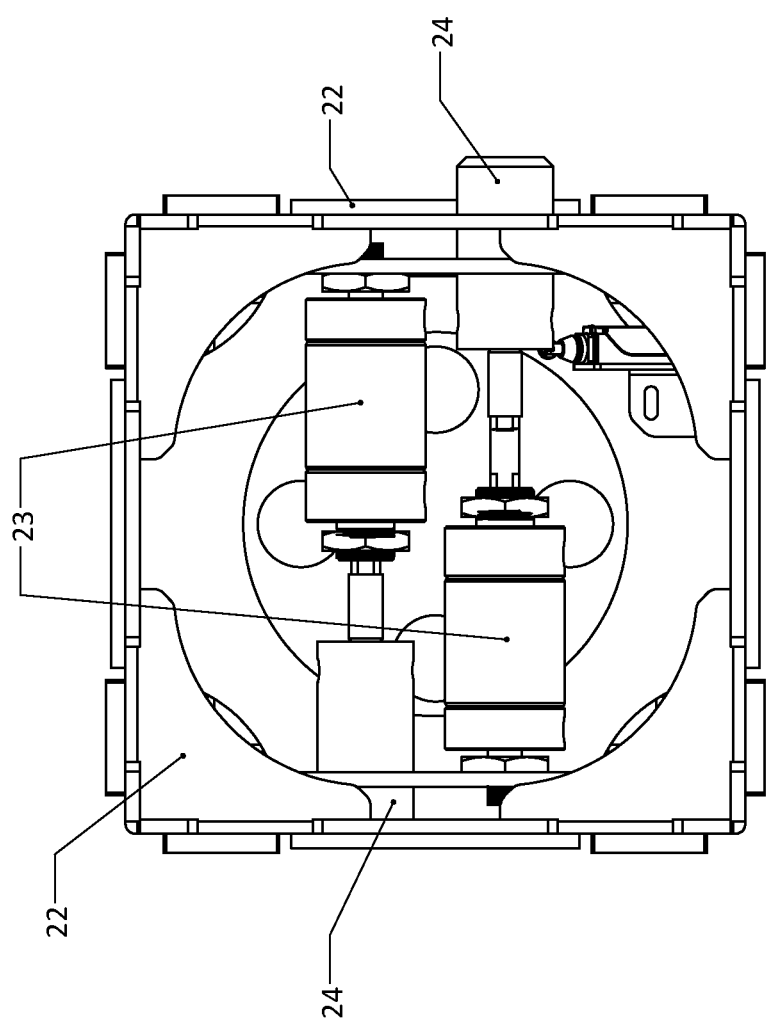
FIG. 10 is top view of the lower extension showing two pneumatic cylinders that drive pins through apertures in the lower beam, to lock the lower extension to the lower beam of the main body of the winch column, and that retract the pins from the apertures to unlock the lower extension from lower beam.

FIG. 10 is a top view of the lower extension 22 showing two remote-controlled pneumatic cylinders 23 inside the extension 22 that drive pins 24 through apertures 25 in the lower beam 12 to lock the extension 22 in position relative to the beam 12, for said incremental extension (the apertures being 10-14 inches apart or preferably 12 inches apart over about 10-15 feet, for example). When the cylinders 23 retract the pins 24 from the apertures 25 and the column 10 is raised off the ground a desired amount, the extension 22 falls by gravity to hit the ground, the cylinders 23 then are used to drive the pins through the apertures 25, thus locking the extension in its new, lowered position that results in an increased overall winch column 10 length.

The spike 26 is the lowermost portion of the extension 22 that hits the ground when the extension falls by gravity. The spike 26 may be driven into the ground by further action of the excavator. With the extension 22 locked in said desired position, the excavator may push downward on the vertically orientated column 10 to drive the spike 26 into the ground for anchoring of the bottom end of the column. In certain embodiments, the spike 26 is 2-3 feet long and so the spike 26 extending in the range of 2-3 feet into the ground serves to stabilize the winch column bottom end.

Figure 11:
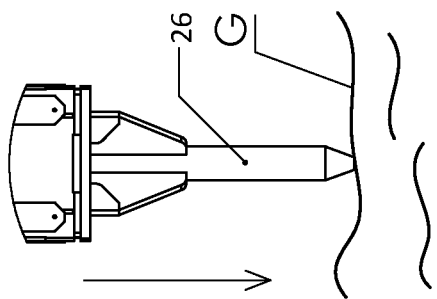
FIG. 11 is a side detail view of the bottom end of the lower extension of in FIG. 9, wherein the spike of the lower extension is resting on the ground.
Figure 12:
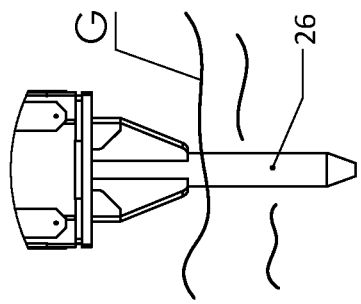
FIG. 12 is a side detail view of the bottom end of the lower extension of in FIG. 9, wherein the spike has been pushed down into the ground, by the excavator pushing the winch column down toward the ground when the lower extension is locked to the lower beam.

FIG. 11 illustrates the spike 26 resting on, or only slightly embedded into the ground G, by the force of gravity sliding the unlocked extension 22 down to the ground G. FIG. 12 illustrates the spike 26 having been driven into the ground G by the excavator E applying downward force on the column 10. The preferred spike 26 extends coaxially down from the extension 22 and, hence, coaxially down from the entire main body of the column 10, so that the spike 26 prevents or lessens the possibility of the bottom end of the installed column 10 sliding horizontally or pivoting relative to the ground G. Thus, the spike 26 in the ground G stabilizes the bottom end of the column in many or all types of earth.

The preferred column 10 is a single, elongated column, without legs or stabilizers extending away from the sides of the column, except to the extent that one or more safety cables may be used and may considered sideways-extending stabilizers. In certain embodiments, one or more safety cables or "guy wires" may also be provided on the column, preferably attached to a bracket on the upper main beam for extending away from the column at approximately a 1:1 ratio from the height of the attachment point, for example, and down to a ground anchor as shown by guy wire 55 in FIGS. 37-42. The one or more guy wires help stabilize the column against forces that are imposed or anticipated during a particular process and/or because of the particular power line structures and tensions. The guy wire(s) are installed to extend away from the column in the direction that prevents pivoting or falling of the column, for example, due to expected or unexpected high-tension of a conductor(s) in a particular direction. For example, a guy wire may be needed when the process comprises handling multiple conductors from multiple poles, and therefore, the corresponding loads/tension, for example, in a running angle power transmission system such as described later in this document for FIGS. 37-42 wherein the winch column at one end of a pole assembly supports the conductors from all the poles. A guy wire may also be installed in certain embodiments between the excavator and the lower beam 12, to further stabilize the winch column, especially when very large conductor tensions that would tend to pull the winch column forward are expected.

The excavator connection to the column 10 may be described as a connection "about midway along the length of the installed column" or slightly above the center of gravity, preferably within the range of 2-10 feet, and preferably 3-6 feet, of the horizontal midline of the installed column, and this excavator connection is preferably retained throughout the processes described herein, as the weight and broad base of the excavator provides excellent stabilization of the column on many terrains. For use of the excavator and winch column on hills or other uneven terrains, FIGS. 18 and 19 and the section below entitled "Adjustment for Non-Level Power Line Site Ground" show and describe the mechanism and method of installing the winch column in the preferred vertical orientation.

It may be noted that the excavator E lifts the column 10 from a truck also carries the column 10 to and from the power line site, and also drives the spike into the ground at the power line site, provides electrical and hydraulic power sources to the winch column, and removes the column from that spiked condition when the repair/placement work is done, all without any other vehicle or a crane being used to handle, stabilize or operate the column 10. Equipment handling, installation and use at the power line site, and removal from the power line site are therefore made substantially more efficient than with conventional equipment and methods, as is moving the column 10 between poles of a single power line and and/or to another power line.

As will be understood by comparing FIGS. 3, 7 and 8, the winch column frame 20 on an upper end of the main body also may be raised and lowered to adjust the overall length of the winch column device, and particularly to place the frame 20 at an advantageous level/height relative to the upper end of the existing pole, and especially relative to the conductors on the existing pole. Thus, the main body of the winch column device may be extended or retracted to various overall lengths by adjustment of the extension 22, and the frame 20 may be raised or lowered by sliding up and down and being locked in a desired level, relative to the upper beam 14, these adjustments being for effective and efficient placement of the device adjacent the existing pole and effective and efficient capture and manipulation of the conductors by the height-adjusted frame 20. The raising and lowering of the frame 20 is preferably accomplished by a remote-controlled hydraulic cylinder 30 that lifts or lowers the frame 20 to the desired height, and a remote-controlled latch system (40 in FIGS. 3, 7, 8, 13) comprising an open-framework, box-shaped structure (41 in FIGS. 21, 22, 23, 24) that is slidable up and down the upper beam and houses pneumatic cylinders 42 (FIGS. 22 and 24) that lock the frame 20 in the desired height by sliding pin(s) 44 (FIG. 24) into apertures 46 (FIGS. 3, 7, 8, and 13) in the upper beam 14. Such a pin and aperture system allows vertical adjustment of the frame 20 in incremental amounts based on the distance between apertures 46. Apertures 46 are preferably provided along about 15 feet of the length of the upper beam 14, with a distance between apertures 46 in the range of 10-15 inches, for example 12 inches.

Figure 13:
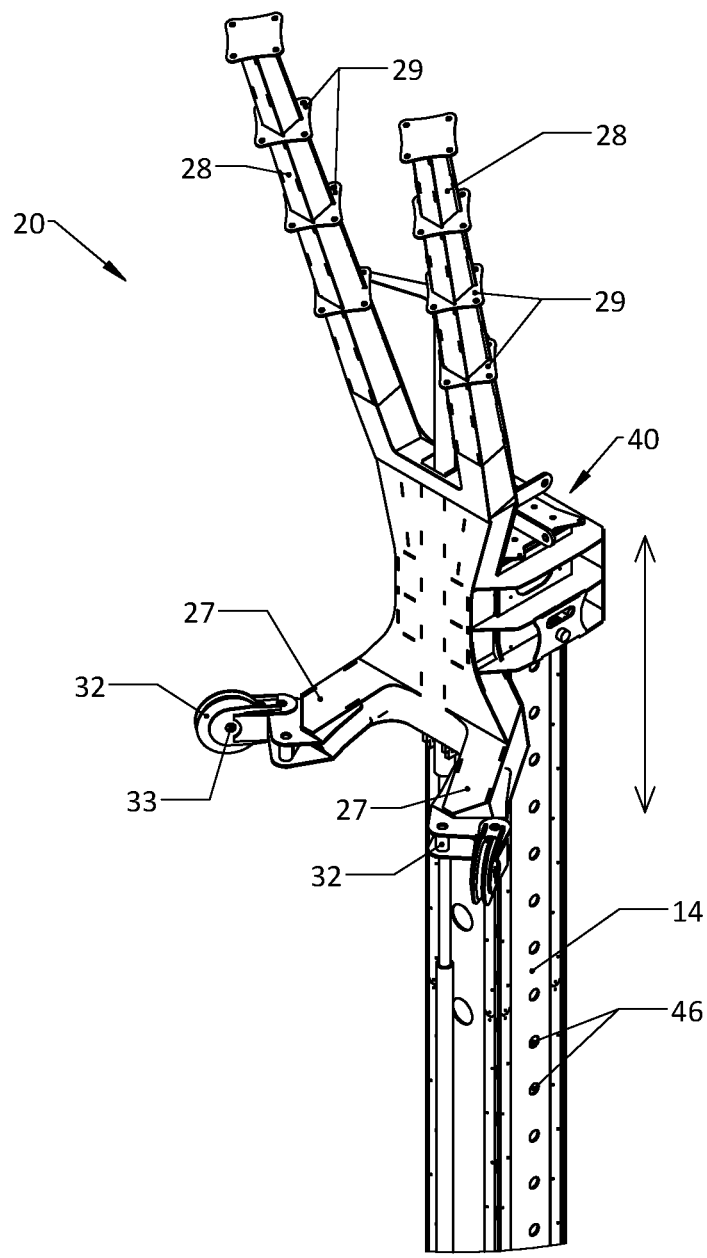
FIG. 13 is an enlarged detail view of the frame on the upper beam of the main body of the winch column that is circled and labeled "FIG. 13" in FIG. 8, illustrating that the frame is raisable and lowerable along the upper beam.

As shown to best advantage in FIG. 13 (frame 20 installed and raised on upper beam 14) and FIGS. 21-24 (frame 20 detached from upper beam 14), the frame 20 has a shape that facilitates the capture and winching of conductor(s), for tension adjusting and removal of the power-transmission lines ("conductors") from the existing pole, and that facilitates releasing of winching for transferring the conductor(s) and the conductor-tension to the new pole. The shape preferably comprises the frame 20 having arms 27 that extend out toward the power line structure/pole in directions/positions that direct winch lines in advantageous directions. The shape preferably also comprises the frame 20 having arms 28 that extend mainly upward and to a lesser extent forward and that have multiple line-connection locations for receiving and holding lines from the existing pole, especially static lines that typically exist higher than the conductors and at or near the top of a power transmission pole/structure. The right and left upper arms may be described, therefore, as extending "upward", wherein it will be understood from this paragraph and the drawings, that "upward" in this context may include forward, but also, in preferred embodiments, upward and slightly forward and slightly to the right and left, respectively, as shown in the Figures. The preferred frame 20 may be described as a K-shape wherein a right and a left of each arm type 27, 28 are provided, for a total of four frame arms 27, 28 extending from a front side of the upper beam 14 toward the existing pole and later toward the new pole, so that the arms 27, 28 extend or "reach" toward and even part way around the poles, for example "cradling" the poles. The right and left lower arms may be described as extending "forward", wherein it will be understood from this paragraph and the drawings, that "forward" in this context may include forward, but also, in preferred embodiments, forward and slightly to the right and left, respectively, as shown in the Figures.

The preferably K-shaped frame 20 may be considered elongated, wherein two arms 27 extend forward at a lower level and two longer arms 28 extend up and forward at a relatively higher level. Further, the frame 20 is adjustably movable on the upper beam 14, as discussed above, to be raised and lowered to multiple incremental heights above the ground. This way, the entire frame may be adjusted to place arms 27, which are more horizontal than vertical, to be generally or exactly at the level of the conductors, for example, within less than a foot of the same elevation as the conductors. Right and left arms 27 may be used for a single conductor, multiple conductors, or different pieces of a single conductor for sleeving, for example. Elongated arms 28 are more vertical than horizontal, and, upon adjustment of the frame to said level/heights and location that is advantageous regarding arms 27, arms 28 provide vertically spaced pin points 29 or other connection points elements at various level/height options for receiving/supporting static lines. In other words, once the column 10 (via extension 22) and frame 20 (via cylinder 30 and latch system 40) are adjusted vertically to place arms 27, for example, at or near the level of the conductors, the vertically-elongated arms 28 will tend to have at least one pin point 29 on each arm, for example, in the form of plate(s) having apertures, that is at an effective height/level to receive and hold the static lines during the repair/replacement of the existing pole. This may be accomplished in many embodiments, given current power line systems, by having the right and left arms 28 each being about 10 feet long, and having the top end of each arm 28 being on a horizontal plane that is about 15 feet above the horizontal plane of the sheave 32 of a respective right or left arm 27. The arms and other portions of frame 20 in each of FIGS. 21-24 may be considered to be drawn to scale and so these Figures may be measured and used to determine relative lengths and relative angles of the various arms and other portions of the frame 20.

Therefore, the winch column may be adjusted in length by sliding and locking the extension in a desired lowered extension position, and the frame may be adjusted by sliding and locking the frame in a desired raised frame position, so that the lower arms are at the level of the conductors on the existing pole (for example, within 1 foot of the elevation of the conductors). Also, the hoist systems may then be connected to selected connection pin points 29 on the upper arms so that the hoists are at the level of the static lines on the existing pole (for example, within 1 foot elevation of the static lines); the winch cables and the hoist systems may be said, in such embodiments/methods, to extended substantially horizontally to the conductors and static lines, respectively, to effectively capture the conductors and static lines, and then support and move the conductors and static lines away from the existing pole.

Figure 14:
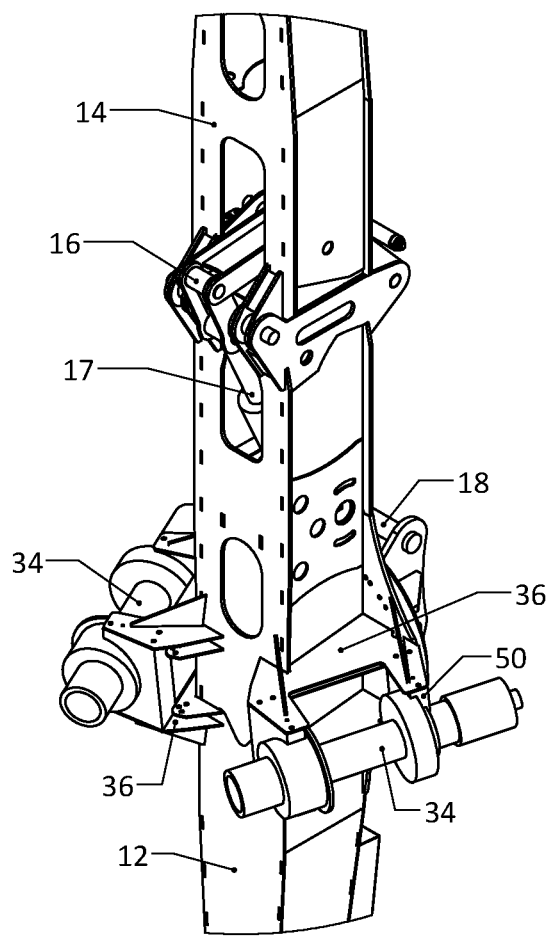
FIG. 14 is an enlarged detailed view of the central region of the winch column that is circled and labeled "FIG. 14" in FIG. 8, this central region comprising the hinge/folding-linkage connected to a hydraulic cylinder housed inside and connected to the lower beam of the column for folding the winch column by pivoting of the upper beam relative to the lower beam of the winch column, the winches for holding and controlling the winch cables (not shown here) that extend from the winches to sheaves on lower right and left arms of the frame of FIG. 13, and the coupler on the back side of the lower beam of the winch column that connects to a conventional quick-connect coupler of an excavator.
Figure 15:
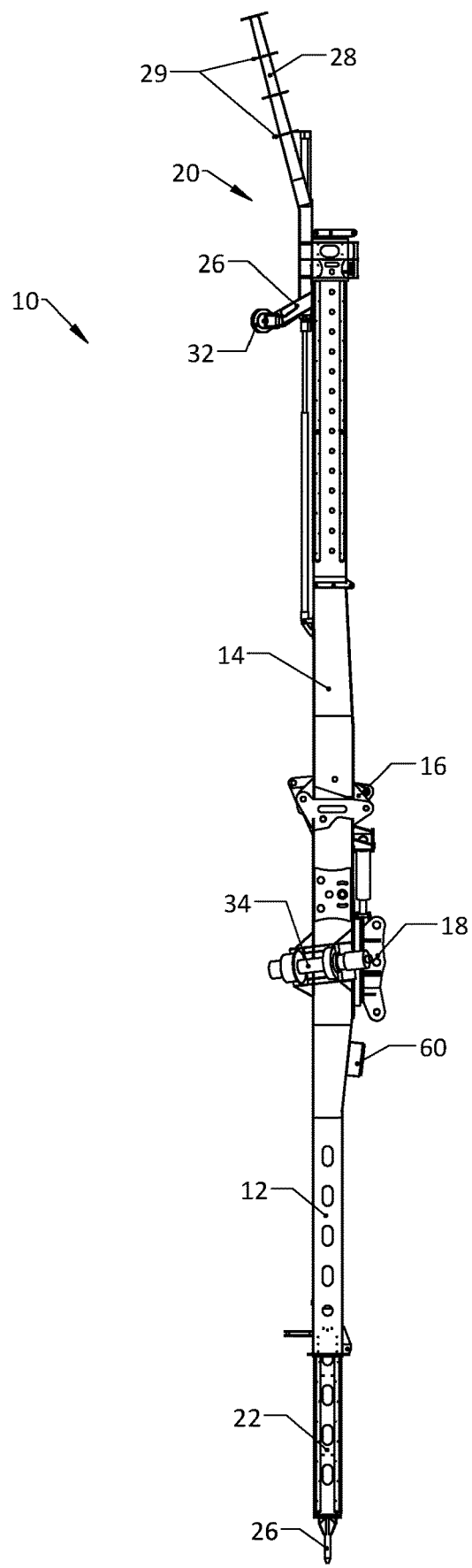
FIG. 15 is a left side view of the winch column of FIG. 8.
Figure 16:
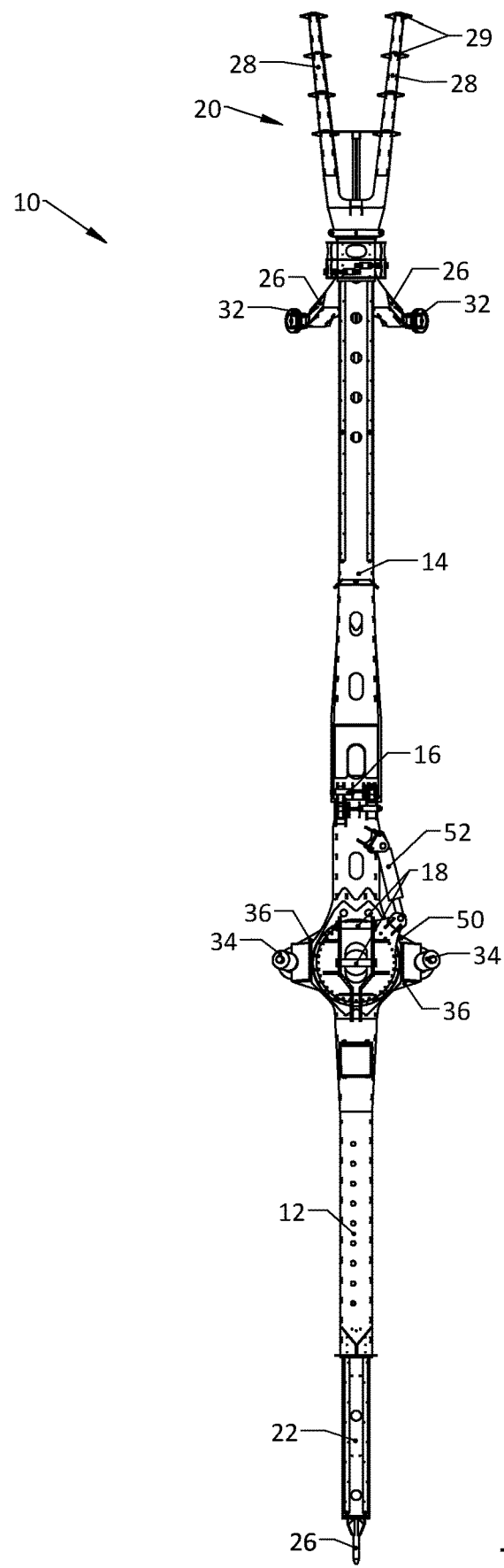
FIG. 16 is a rear side view of the winch column of FIG. 8.
Figure 17:
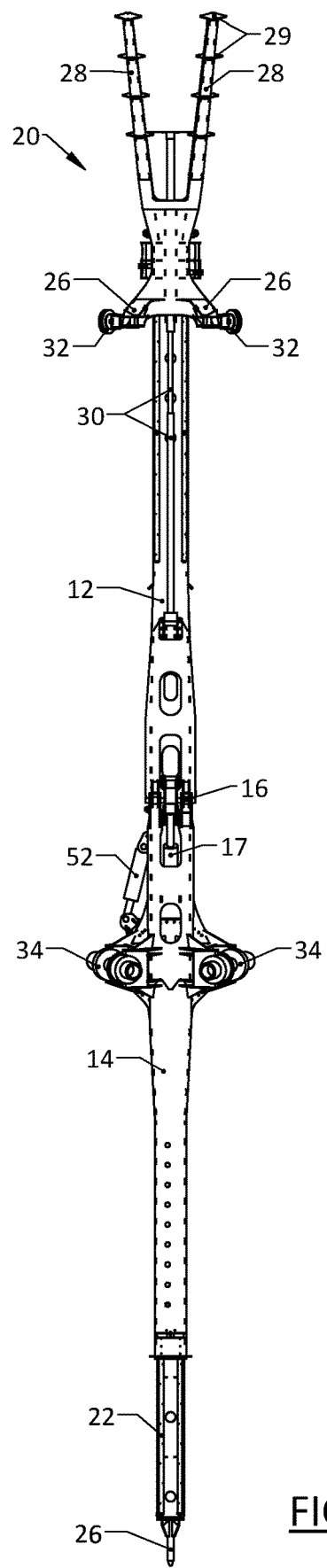
FIG. 17 is a front side view of the winch column of FIG. 8.

In preferred embodiments, in order to support and/or manipulate the conductor(s) via lower arms 27, each of the right and left lower arms 27 comprises a winch sheave wheel 32 (or simply "winch sheave" or "sheave") cooperating with a respective right and left winch 34 (FIGS. 7, 14-17) mounted on winch brackets 36 on lower beam 12 at or near the level of the coupler 18 and slewing ring 50 (FIGS. 14 and 16). Each of the right and left sheaves 32 receives a respective right and left winch cable 38 from a respective right and left winch 34. See FIGS. 25-42 to see the installed winch cables 38, 38R, 38L, 38LX, whereas FIGS. 1-24 do not include the installed cables 38 for simplicity of drawing. It will be understood from FIGS. 25-42 and the description later in this document that the right winch cable is controlled by the right winch and extends upward, from the right winch and along the right side of the main body of the column, to the sheave of the right lower arm (27), where the right cable is redirected by the right sheave to a position effective for extension to a conductor, for example, a conductor on the right side of the existing pole, for conductor removal and for extension back to the new pole for conductor replacement. Likewise, the left winch cable is controlled by the left winch and extends up, from the left winch and along the left side of the main body of the column, to the sheave of the left lower arm (27), where the left cable is redirected by the left sheave to a position effective for extension to a conductor, for example, a conductor on the left side of the existing pole, for conductor removal and for extension back to the new pole for conductor replacement. Both winches 34 are remote-controlled. Each of the right and left sheaves is rotatably mounted to a bracket that is horizontally pivotal and self-aligning to multiple positions, for example, a generally forward-extending position and to a right- or left-extending position, respectively, to be generally parallel to the direction of tension of the conductor to be supported during pole replacement or repair.

Further, each winch sheave comprises a protected tension/load sensor pin or "tension sensor" 33, shown to best advantage in FIGS. 21-24, for sensing tension on the conductor, due to the winch cable and hence the sheave supporting the conductor load. The tension sensors 33 may be integrated into the axle of each sheave, to sense force applied by the conductor on the sheave wheel.

Adjustment for Non-Level Power Line Site Ground:

In certain embodiments, the quick-connect coupler 18 for connection to the hydraulic excavator arm A is combined with a slewing ring 50 for allowing tilting/pivoting of the column 10 relative to the excavator E. This tilting/pivoting allows the column 10 to be adjusted into a vertical deployed orientation, even if the excavator E is on uneven or sloped ground. The slewing ring 50 may be considered a large, circular bearing connecting the coupler 18 to the lower beam 12, so that the lower beam 12, and hence the entire column 10, can rotate/pivot on the central axis of the circular bearing, controlled by hydraulic cylinder (see 52 in FIGS. 7 and 16-19). Specifically, the column 10 rotates so that the central longitudinal plane through the column that extends midway between the front and the rear of the column 10 rotates on the central axis of the slewing ring 50.

Figure 18:
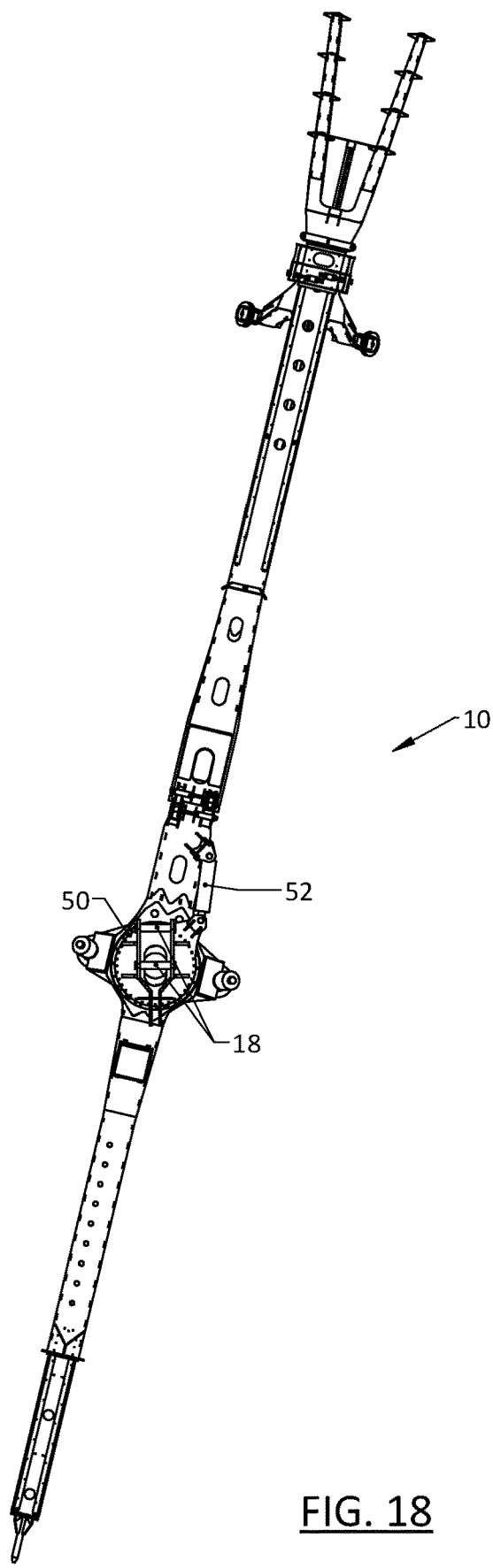
FIG. 18 is a rear side view of the winch column of FIG. 8, wherein the winch column has been rotated about 20 degrees, on the central axis of the slewing ring "circular bearing" that is integrated into the connection between the lower beam of the winch column and the quick coupler, which attaches the winch column to the excavator or vehicle and which is below the hinge/folding linkage of the winch column, to allow for lateral rotational adjustment of the winch column, for example as would be useful to bring the winch column to vertical if the excavator or vehicle holding the winch column were parked on ground sloping in a first direction during use of the winch column, wherein the hydraulic cylinder that rotates the winch column relative to the quick coupler of the winch column may be seen in an retracted-cylinder-rod condition.
Figure 19:
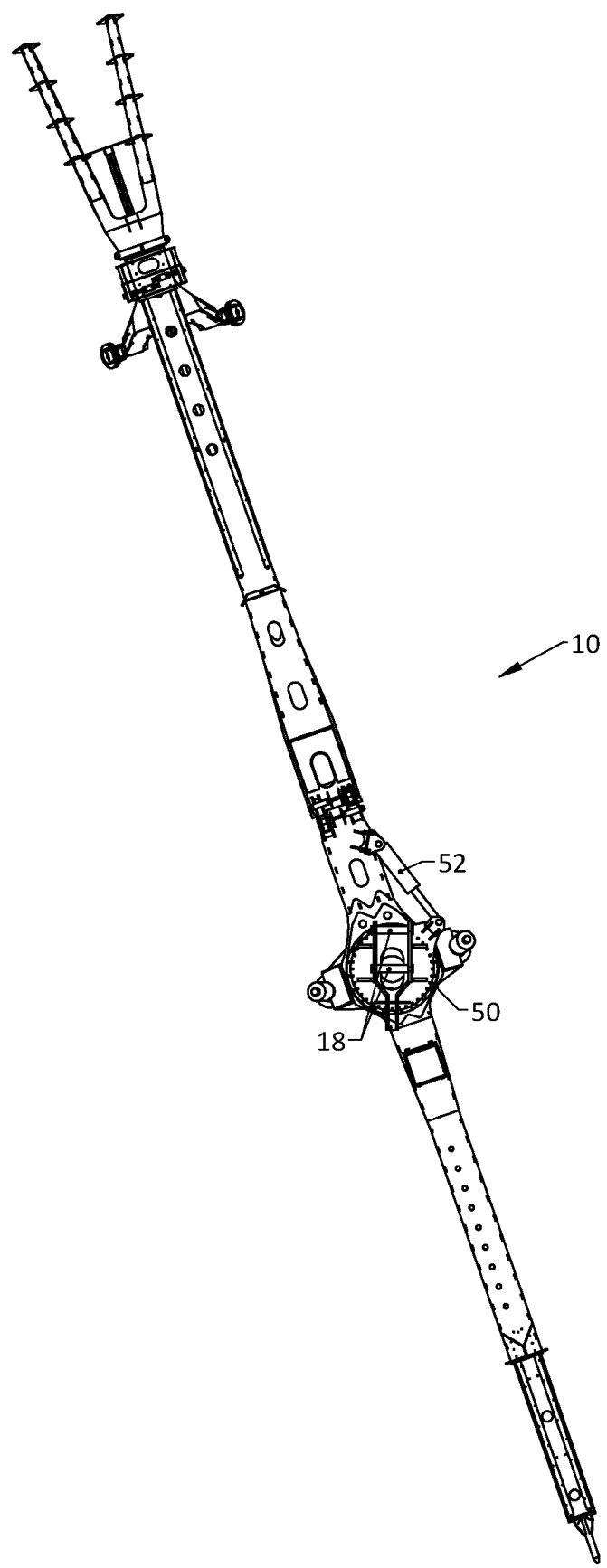
FIG. 19 is a rear side view of the winch column of FIG. 8, wherein the winch column has been rotated about 20 degrees in the opposite direction compared to FIG. 18, for bringing the winch column to vertical if the excavator were parked on ground sloping in a second direction opposite said "first direction" described in FIG. 18, wherein the hydraulic cylinder that rotates the winch column relative to the quick coupler is in an extended-cylinder-rod condition.

See the orientation of the coupler 18 with slewing ring 50, relative to all other portions of the winch column 10, and the position/condition of the hydraulic cylinder 52, in FIGS. 16, 18 and 19. In FIG. 16, the coupler 18 and slewing ring 50, and the entire column 10, are vertical on the drawing sheets, and the cylinder 52 is in intermediate extension. In FIG. 18, however, the column 10 has pivoted about 20 degrees to place the top end of the column 10 to the right in the figure, and the cylinder 52 is in full retraction. In FIG. 19 has pivoted about 20 degrees in the opposite direction with the top end of the column 10 to the left in the figure, and the cylinder 52 is in full extension. It will be understood that the pivoting in FIGS. 18 and 19 is not done to deploy or use the column 10 in a non-vertical orientation, but rather the pivoting is done to "right" the column 10 to vertical in the event that the excavator E, when in place for the process of existing pole replacement or repair, is on uneven ground or a hill. This way, the column 10 may be installed for use in the desired safe and effective vertical orientation even when the excavator holding it for installation and throughout use is not on perfectly horizontal ground.

Certain embodiments of the winch column include an electrical/junction box 60 (FIG. 15). Lights, computer(s), and electric air compressors and safety components such as sensors on all locking pins, are the electrically powered component loads that are powered by the excavator. These are powered by the excavator via a quick connect electrical connector that connects from the excavator to the onboard load center located in the junction box 60 on the winch column. Hydraulic power is provided to the winch column by quick connected hydraulic lines from the excavator's main hydraulic system.

Referring Specifically to FIGS. 25-42 Showing Examples of Use:

FIGS. 25-30 illustrate certain embodiments of the winch column and process for use with a power transmission line of the "dead-end" or "dead-end conductor" type, which type is well-known in the power line industry. FIGS. 31-36 illustrate certain embodiments of the winch column and process for use with a power transmission line of the "dead-end angle" or "dead-end angle conductor" type, which type is also well-known in the industry. FIGS. 37-42 illustrate certain embodiments of the winch column and process for use with a power transmission line of the "running angle" or "running angle conductor" type, which type is also known in the industry. In each of the drawings, the conductors and static lines are shown as ending various distances from the poles or the winch pole, but it will be understood that the conductors and static lines extend much further, for example up to about 1200 feet, continuously to the next pole/structure or other power transmission equipment. Also, the poles and guy lines of the poles are understood to be installed and anchored, respectively, in the ground. In the first figure of the series of drawings for each process, that is, FIGS. 25, 31, 37, reference numbers or letters are shown for several or all of the poles, conductors, static lines, pole guywires, and horizontal strain insulators, but are mainly left off the other drawings of each series for simplicity and ease of viewing. Reference numbers are not included in FIGS. 25-30 for most of the elements of the winch column 10, for simplicity and ease of viewing, as the winch column 10 is fully described above and called-out by reference numbers in FIGS. 1-24.

FIGS. 25-30 show multiple steps of the dead-end process 100, wherein one existing pole 101 of the three existing poles is being replaced. It will be understood that one or both of the other poles 101' could be replaced by the same or similar steps.

Figure 25:
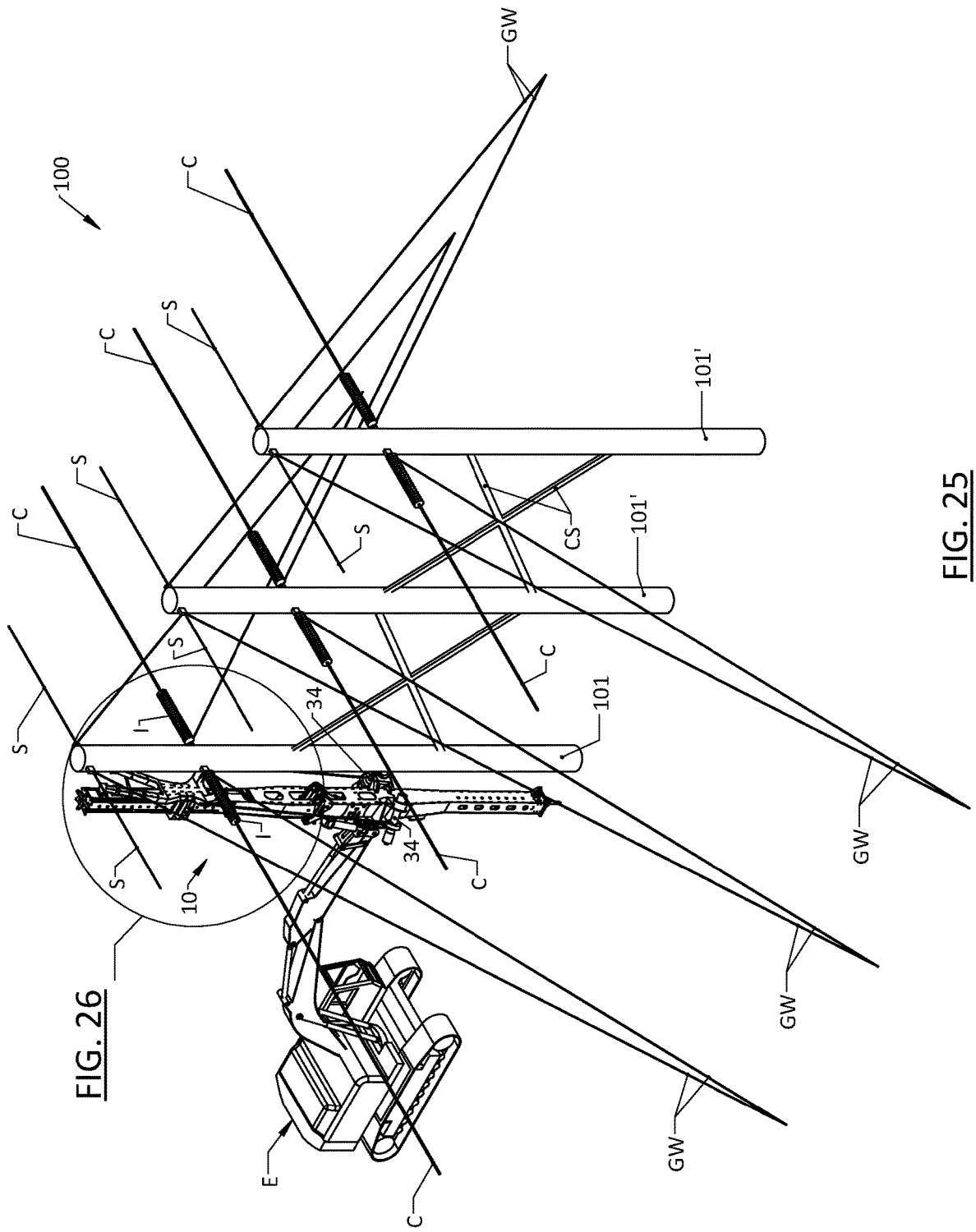
FIG. 25 is a right-side perspective view of one embodiment of a winch pole and process for handling and supporting conductors and static lines of a power pole in a "dead-end" style of pole assembly, wherein this figure shows a method step wherein the winch pole is installed in place but not yet connected to conductors or static lines.
Figure 26:
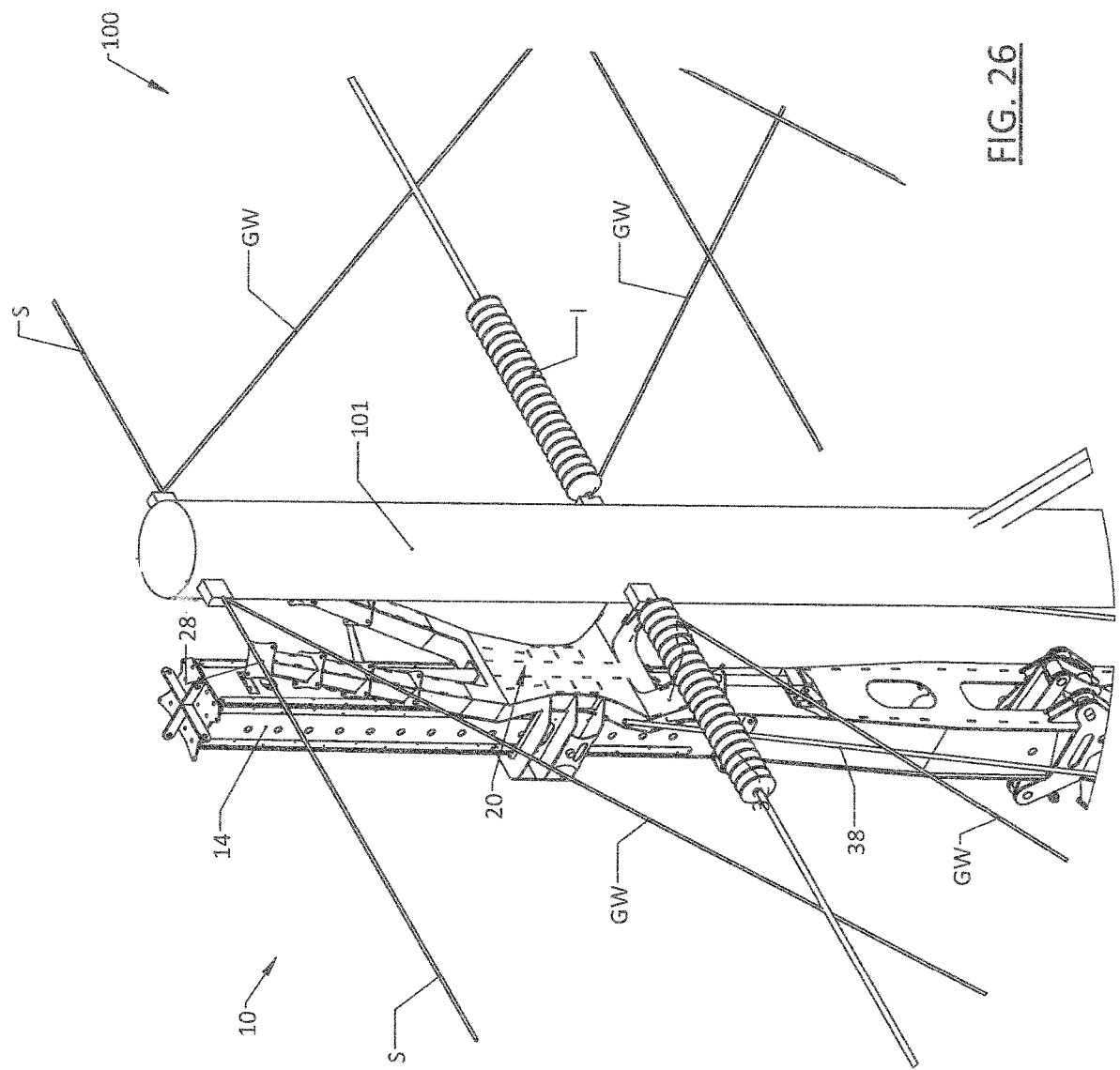
FIG. 26 is an enlarged detail view of the area circled in FIG. 25.

FIG. 25 shows the winch column 10 installed, and held by the excavator E, adjacent to the existing pole assembly of three poles 101, 101', 101', each of which poles carries conductors C with horizontal strain insulators I connecting the conductors C to the pole, as is known in the field of "dead-end" power line systems, and the three poles are structurally connected and strengthened by cross-struts CS. It may be noted that the conductors and static lines at the top of the poles run horizontally or generally horizontally, and that the poles and also the winch pole are perpendicular to the conductors and static lines, that is, vertical. In FIG. 25, the winch column 10 is installed and stabilized, as explained earlier in this document, adjacent to the existing pole (the first of three existing poles) to be replaced, but no connection has been made to the conductors C or static lines S. Winch cables 38 are seen extending from the winches 34 upward along the upper main body to the sheaves 32, but the distal (outer) ends of the winch cables are at the sheaves 32 and not yet connected to the conductors C. In FIG. 25, all installation and stabilization of the winch column 10, as discussed above, has been done by the excavator moving the winch pole to the existing pole 100, and by remote control to lock the lower extension in place (here, the lower extension is lowered little or not at all), to push the spike into the ground (here, the spike is part way into the ground, so still partly visible), and to adjust the level of the frame and lock it in place. FIG. 26 is an enlarged, detail view of the top portion of the winch column 10 and pole 101 of FIG. 25.

Figure 27:
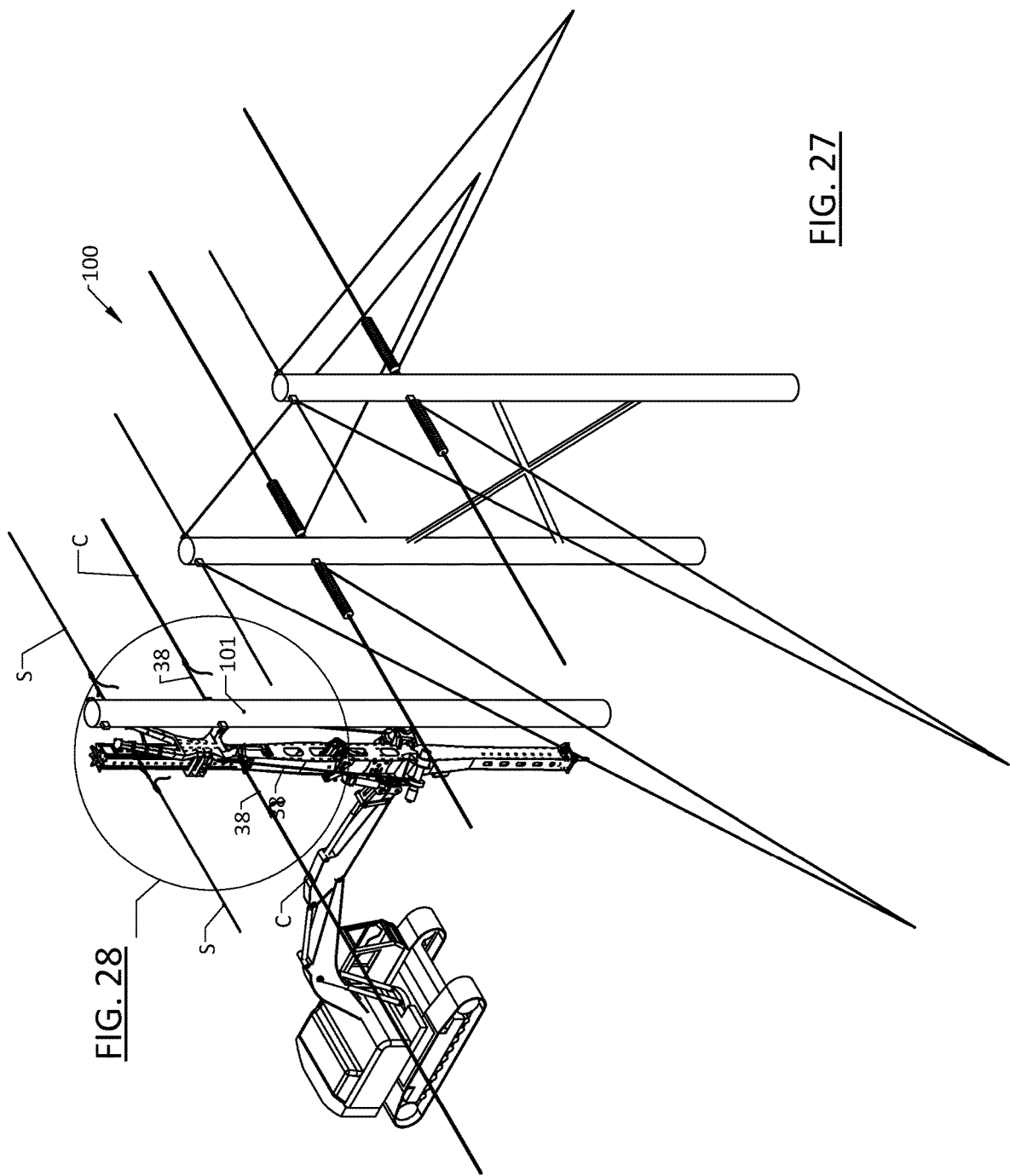
FIG. 27 is a right-side perspective view of the continuing process of FIG. 25, wherein the winch system winch cables have been connected to, and have lifted, the conductors away from the existing pole, and hoist lines have been connected to, and have lifted, the static lines away from the existing pole, to support the conductors and static lines separately from the existing pole for replacement of the existing pole.
Figure 28:
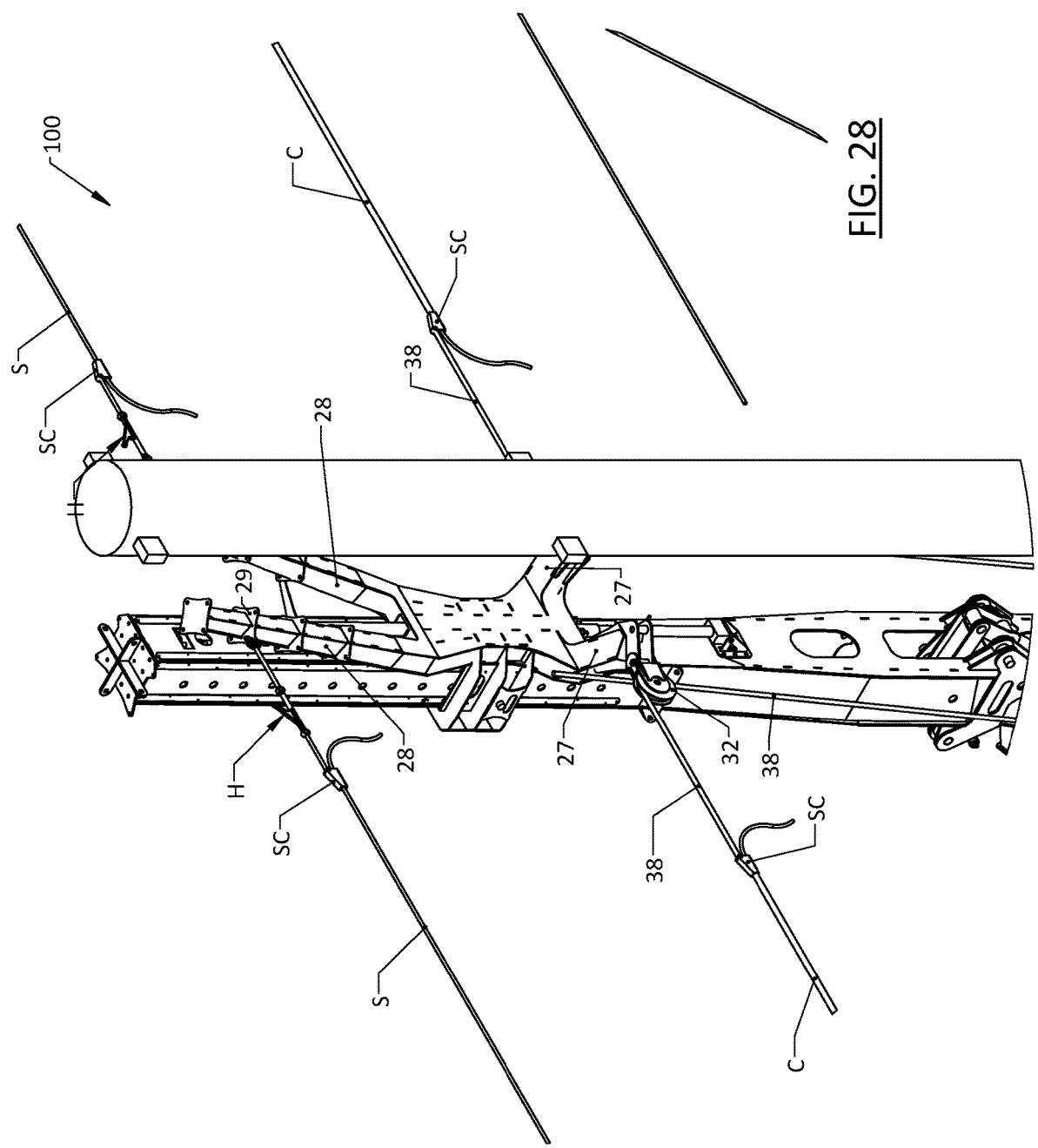
FIG. 28 is an enlarged, detail view of the area circled in FIG. 27.

FIG. 27 and enlarged detail FIG. 28 show the winch column 10 holding and supporting both the conductors C and the static lines S after their disconnection from the existing pole 101. The conductors C have been captured by the winch cables 38 by means of suspension clamps SC, which are known in the power line field, or other connectors. Said capturing is done when the conductors are still supported on the existing pole, but the winch cables 38 are then reeled-in to take-up the weight/tension of the conductors C, so that personnel (not shown) can disconnect the conductors from the existing pole. Due to the weight/tension inherently on the disconnected conductors C, the conductors C will tend to move away from the existing pole 101. If needed, the winch cables may be reeled-in further to move the conductors away from the existing pole 101 to the position shown in FIGS. 27 and 28 while maintaining the proper tension on, and the elevation level of, each of the conductors C. Maintaining the proper tension is done by monitoring the tension sensors 33 in the winch sheaves 32 and adjusting tension by use of the winches 34.

FIGS. 27 and 28 show the static lines S after they have been captured by a manual hoist assembly H, wherein one end of each hoist assembly H is connected to a pin point 29 connection point at the desired level on respective arm 28 (generally matching the level of the static lines on the existing pole), and the other end of the each hoist assembly H is used to capture the respective static line S by means of a suspension claim SC. Said connection to the pin point 29 and capture of the static line S is performed by personnel (not shown), as is use of the manual hoist (shortening the hoist assembly) to take-up slack in the static line to pull the static line, after disconnection from the pole 100, away from the pole 100 and to the respective arm 28 and to maintain the static line S at the proper level. In FIGS. 27 and 28, the cross-struts have been removed from between pole 101 and the next adjacent pole 101' in preparation for removing pole 101.

Figure 29:
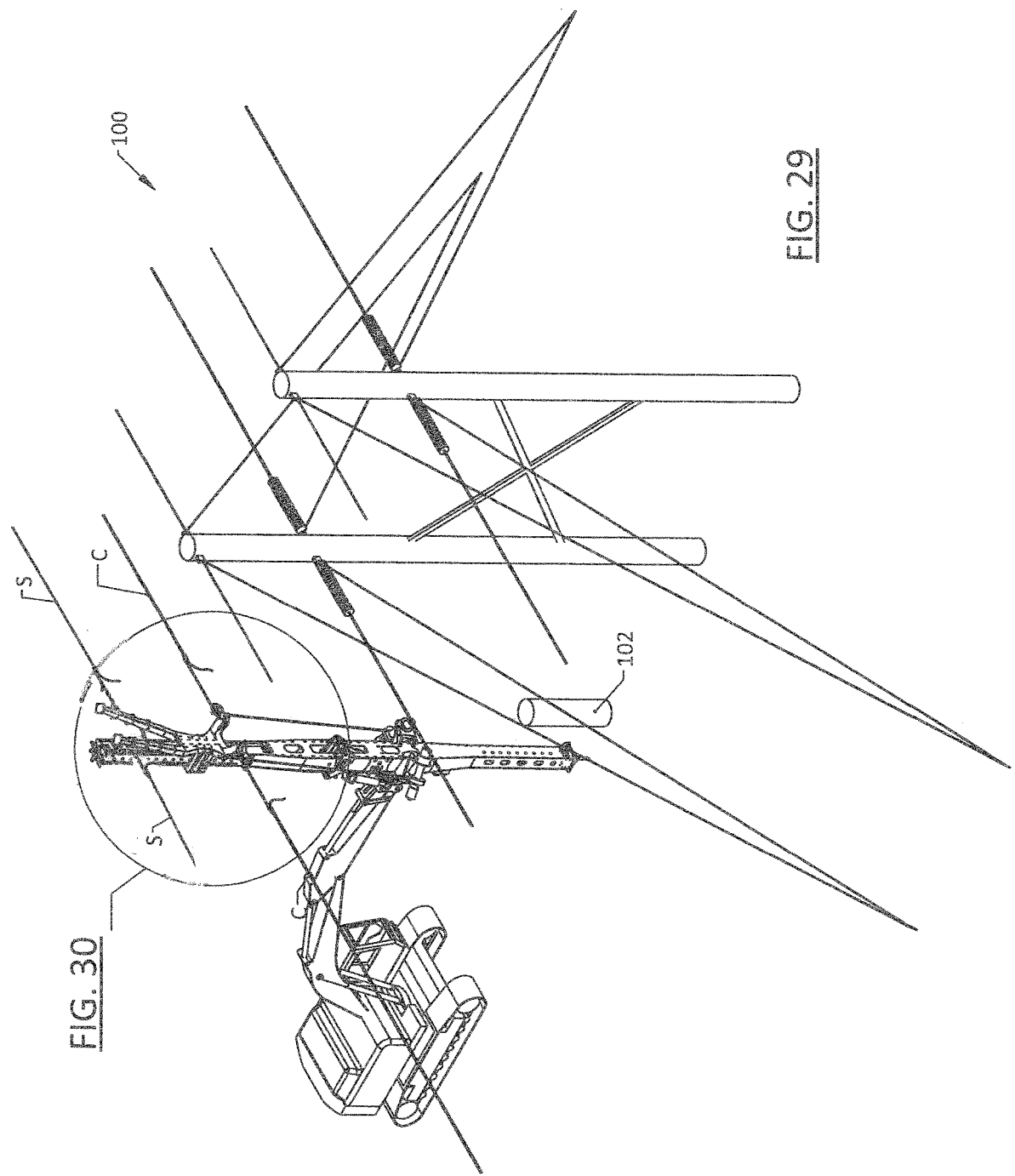
FIG. 29 is the same as FIG. 27, except that the existing pole is represented as a stump to schematically indicate its removal, noting that certain embodiments will comprise complete removal of the entire existing pole.
Figure 30:
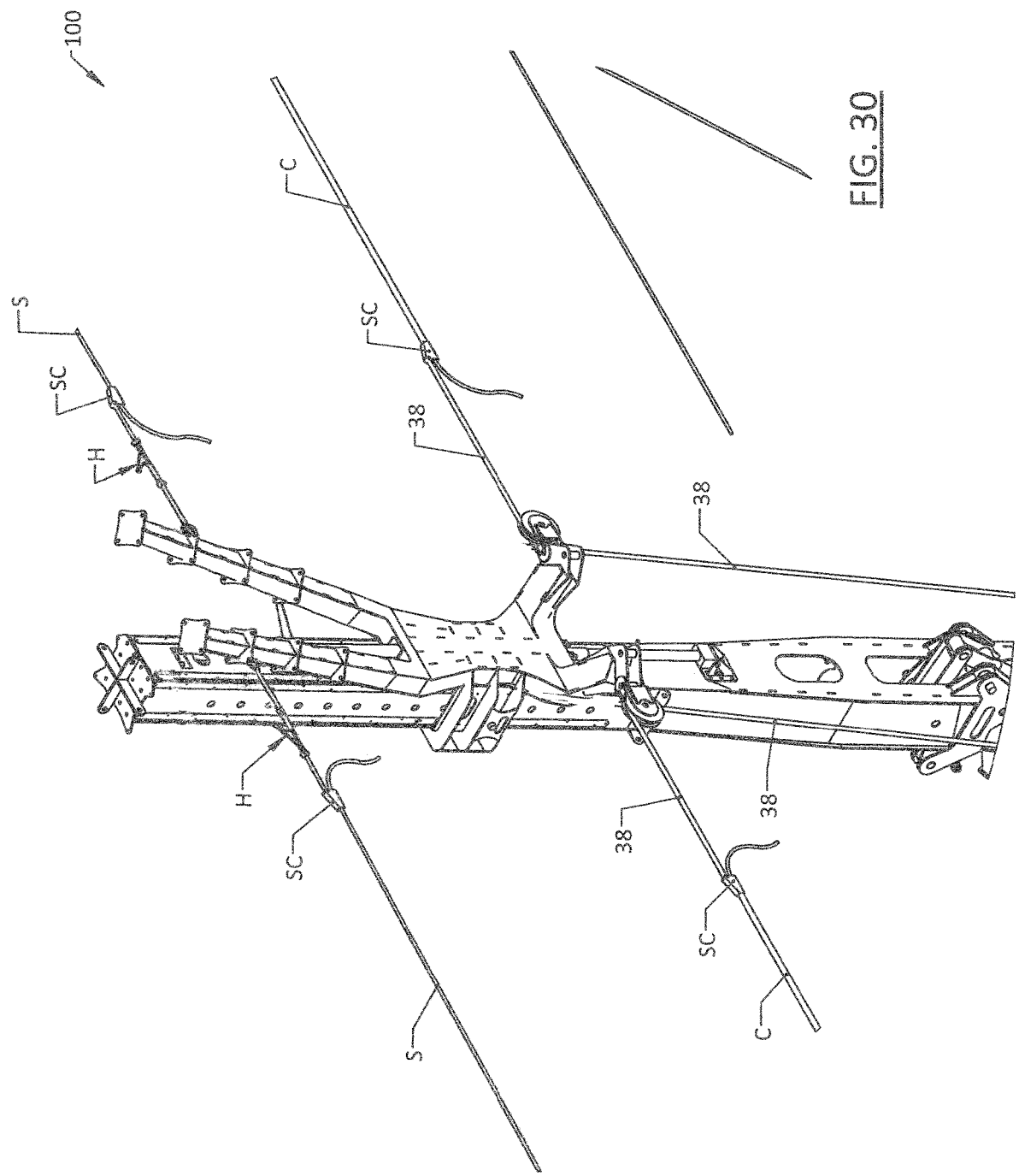
FIG. 30 is an enlarged, detail view of the area circled in FIG. 29.

FIGS. 29 and 30 illustrate that, once the conductors C and static lines S are held and supported by the winch column 10, as in FIGS. 27 and 28, the existing pole may be removed (as represented by the "stump" 102 in FIG. 29). After replacement with a new pole (not shown), typically in or very close to the same place as the stump 102 is shown, personnel guide the conductors C to their proper places on the new pole (while the winch cables are being let-out by remote control of the winches 34), reconnect the conductors C (with strain insulators) onto the new pole, and disconnect the winch cables 38 from the conductors C, whereafter the winch cables can be reeled in again by remote control. Similarly, personnel guide the static lines to, and re-connect them to, the new pole, letting out (lengthening) the manual hoist assembly and then disconnecting the hoist assembly H from the static lines.

FIGS. 31-36 show multiple steps of the dead-end angle process 200, wherein one existing pole 101 of the three existing poles is being replaced. It will be understood that one or both of the other poles 101' could be replaced by the same or similar steps. The winch column, winch lines, and methods used in the dead-end angle process are the same or very similar to those in the dead-end process of FIGS. 25-30, as the main difference between the two processes is that the conductors are connected to the poles at an angle to each other (typically an obtuse angle) as opposed to being parallel to each other, and the two conductors, when supported by the winch column will remain at substantially that same angle to each other.

Figure 31:
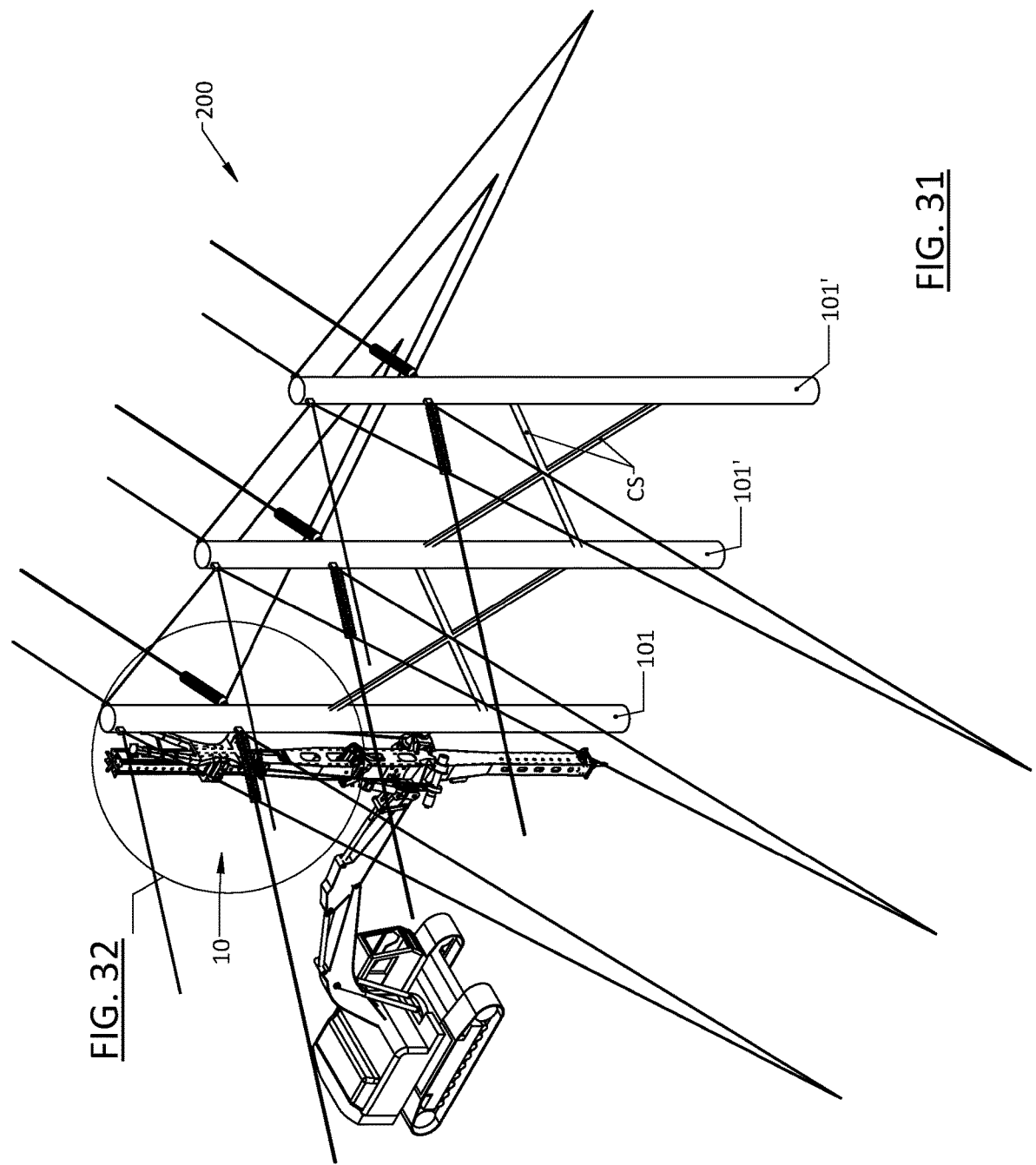
FIG. 31 is a right-side perspective view of one embodiment of a winch pole and process for handling and supporting conductors and static lines of a power pole in a "dead-end angle" style of pole assembly, wherein this figure shows a method step wherein the winch pole is installed in place but not yet connected to conductors or static lines.
Figure 32:
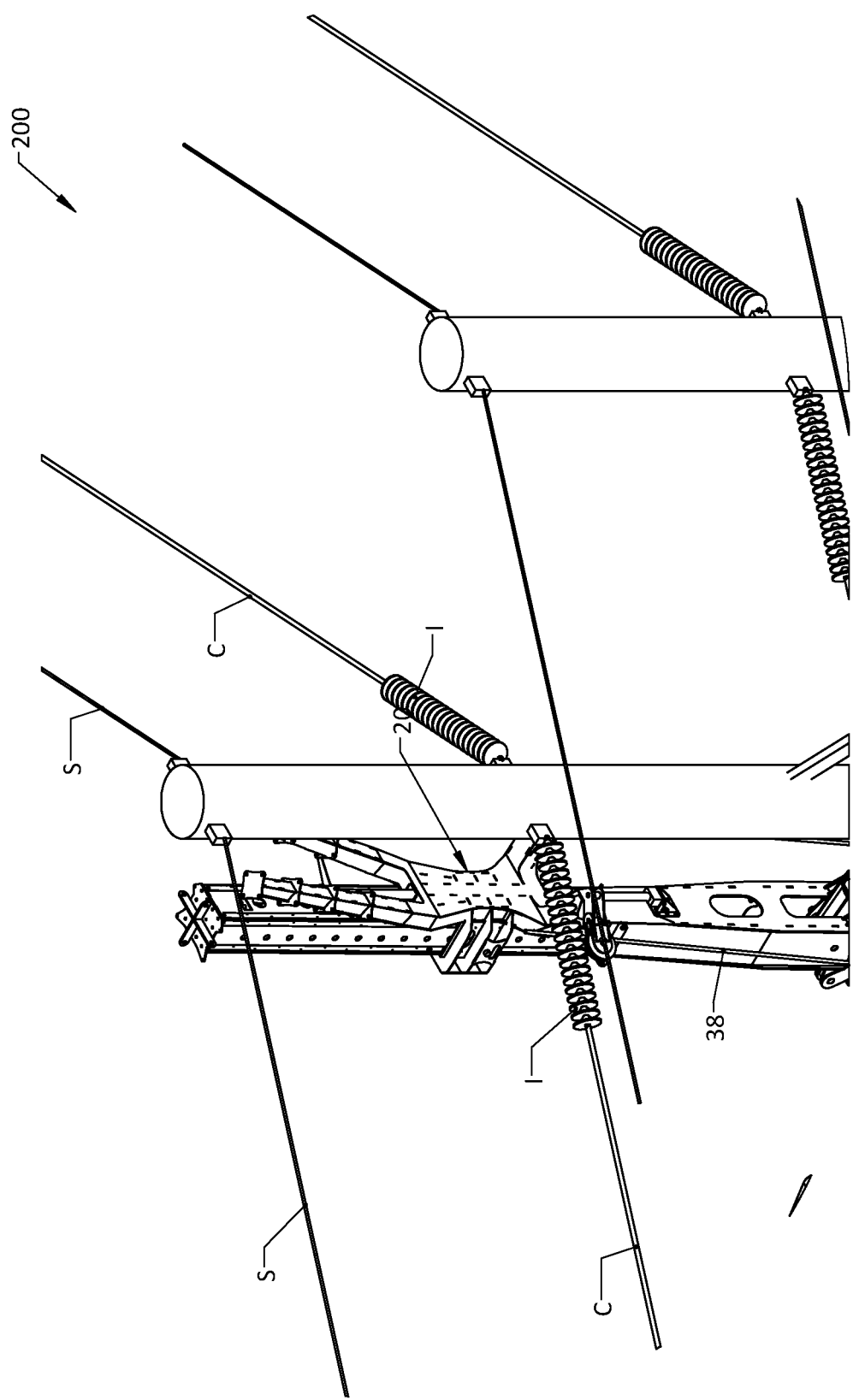
FIG. 32 is an enlarged detail view of the area circled in FIG. 31.

FIG. 31 and enlarged detail FIG. 32 show the winch column 10 installed, and held by the excavator E, adjacent to the existing pole assembly of three poles 101, 101', 101' connected by cross-struts CS, each of which poles carries conductors C with horizontal strain insulators I connecting the conductors C to the pole, wherein the conductors C and strain insulators here extend at angles to each other away from the poles, as is known in the field of "dead-end angle" power line systems. In the same or similar process as described for FIGS. 25 and 26, the winch column 10 is installed and stabilized adjacent to the existing pole 100 to be replaced, but no connection has been made to the conductors C or static lines S. As in FIGS. 25 and 26, winch cables 38 extending from the winches 34 upward along the upper main body to the sheaves 32, but the distal (outer) ends of the winch cables are at the sheaves 32 and not yet connected to the conductors C.

Figure 33:
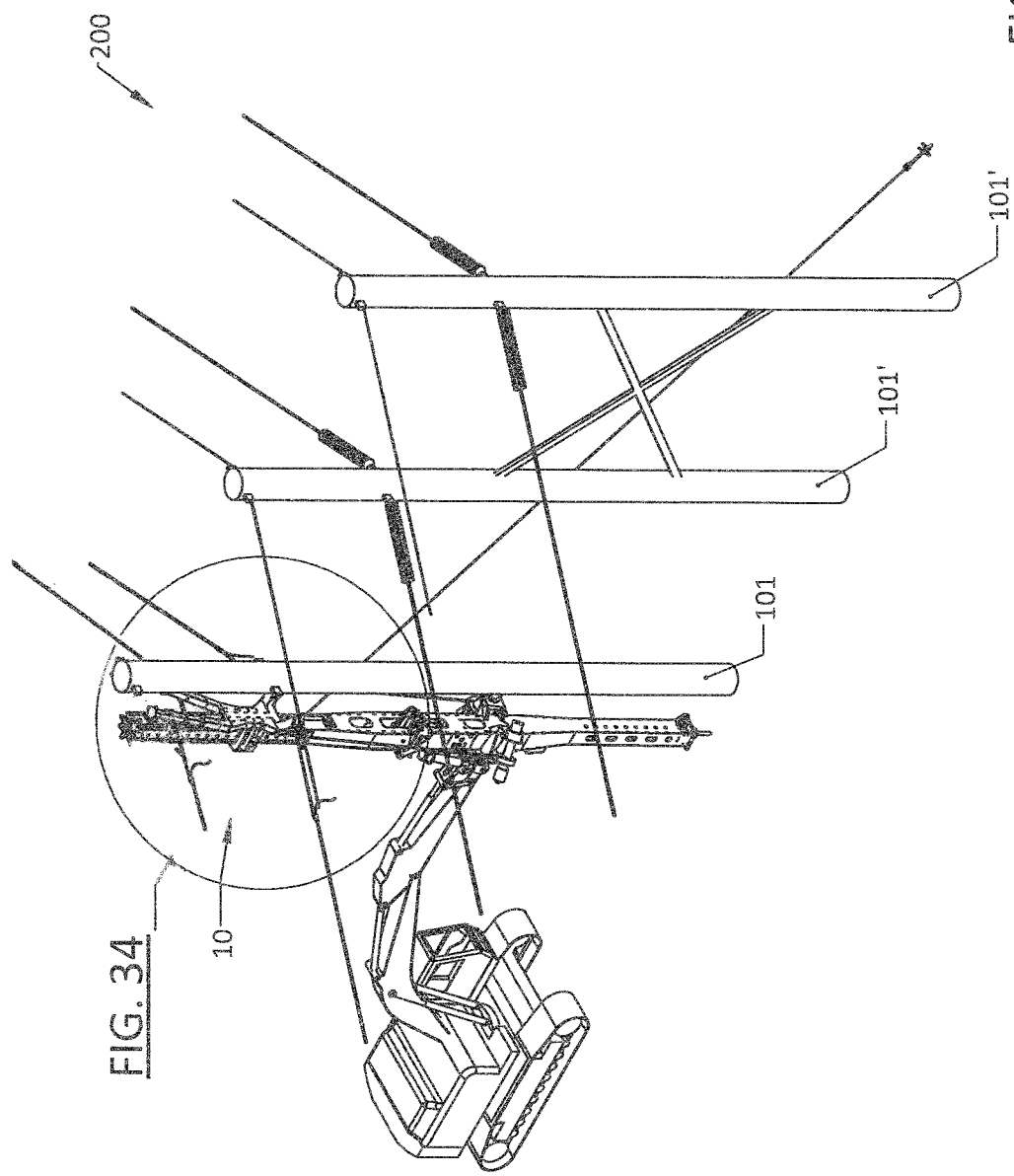
FIG. 33 is a right side perspective view of the continuing process of FIG. 31 wherein the winch system winch cables have been connected to, and have lifted, the conductors away from the existing pole, and hoist lines have been connected to, and have lifted, the static lines away from the existing pole, to support the conductors and static lines separately from the existing pole for replacement of the existing pole.
Figure 34:
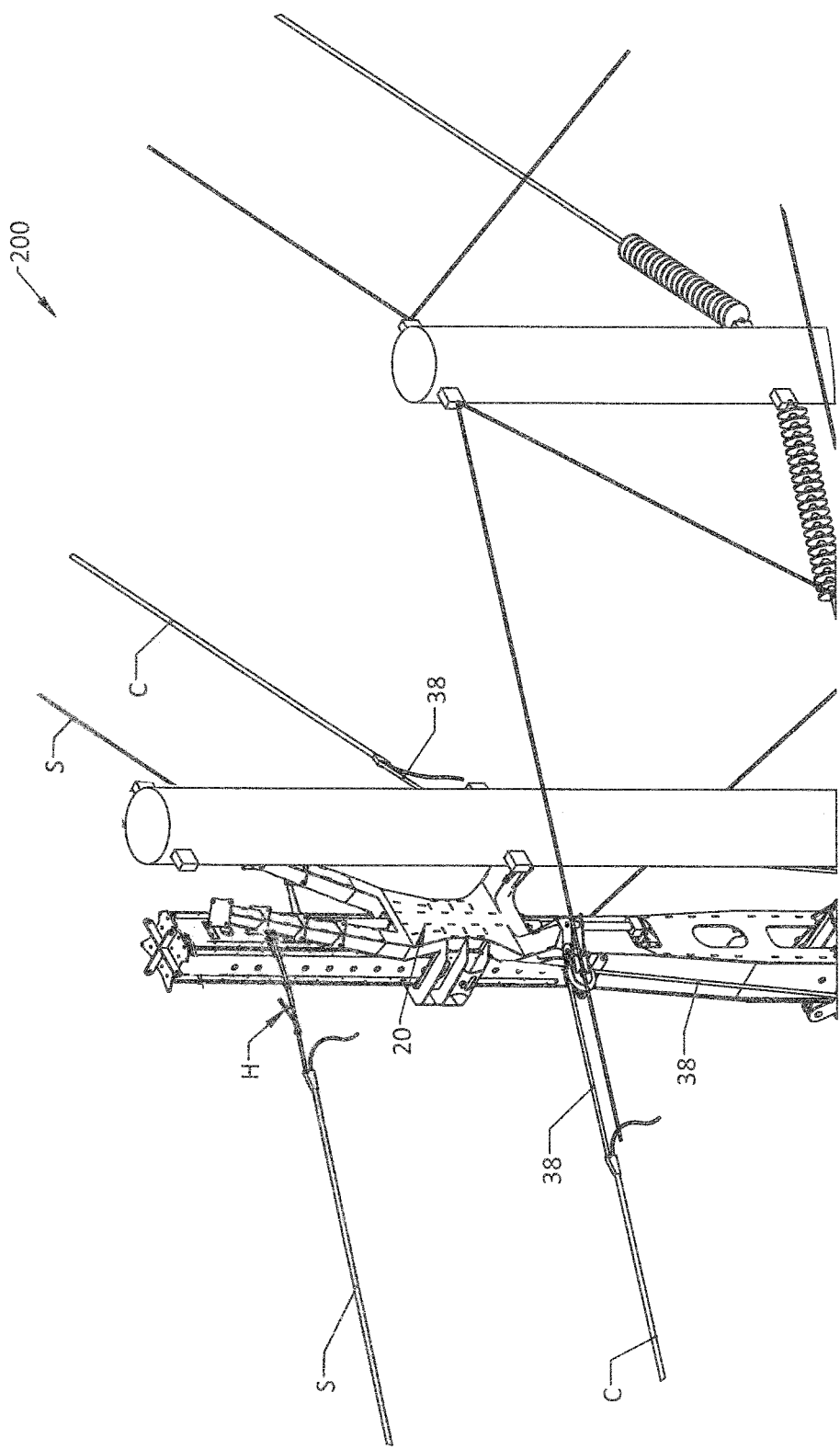
FIG. 34 is an enlarged, detail view of the area circled in FIG. 33.

FIG. 33 and enlarged detail FIG. 34 show the winch column 10 holding and supporting both the conductors C and the static lines S after their disconnection from the existing pole 100. With the same or similar methods as described for FIGS. 33 and 34, the conductors C have been captured by the winch cables 38 by means of suspension clamps SC or other connectors, while the conductors are still supported on the existing pole, and the winch cables 38 are then reeled-in to take-up the weight/tension of the conductors C, so that personnel (not shown) can disconnect the conductors from the existing pole, so that the conductors C can move away from the existing pole 101, and/or, if needed, the winch cables may be reeled-in further to move the conductors away from the existing pole 101 to the position shown in FIGS. 33 and 34. As described for FIGS. 27 and 28, proper tension on, and level of, each of the conductors C is maintained by monitoring the tension sensors 33 in the winch sheaves 32 and adjusting tension by use of the winches 34.

FIGS. 33 and 34 also show the static lines S after they have been captured by a manual hoist assembly H, which is connected and operated by personnel as described for FIGS. 27 and 28. As described for FIGS. 27 and 28, the cross-struts have been removed from between pole 100 and the next adjacent pole 101' in preparation for removing pole 100.

Figure 35:
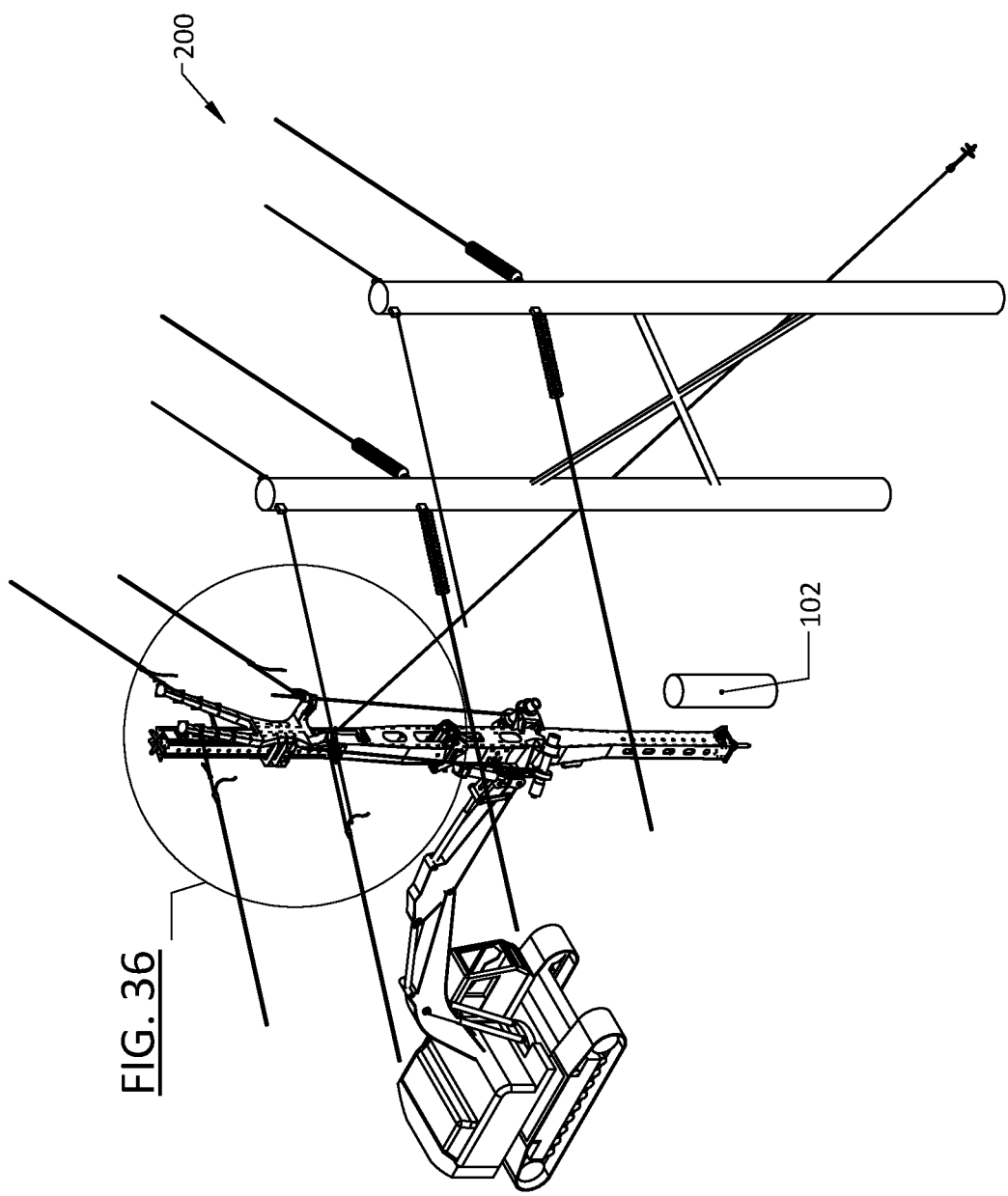
FIG. 35 is the same as FIG. 33, except that the existing pole is represented as a stump to schematically indicate its removal, noting that certain embodiments will comprise complete removal of the entire existing pole.
Figure 36:
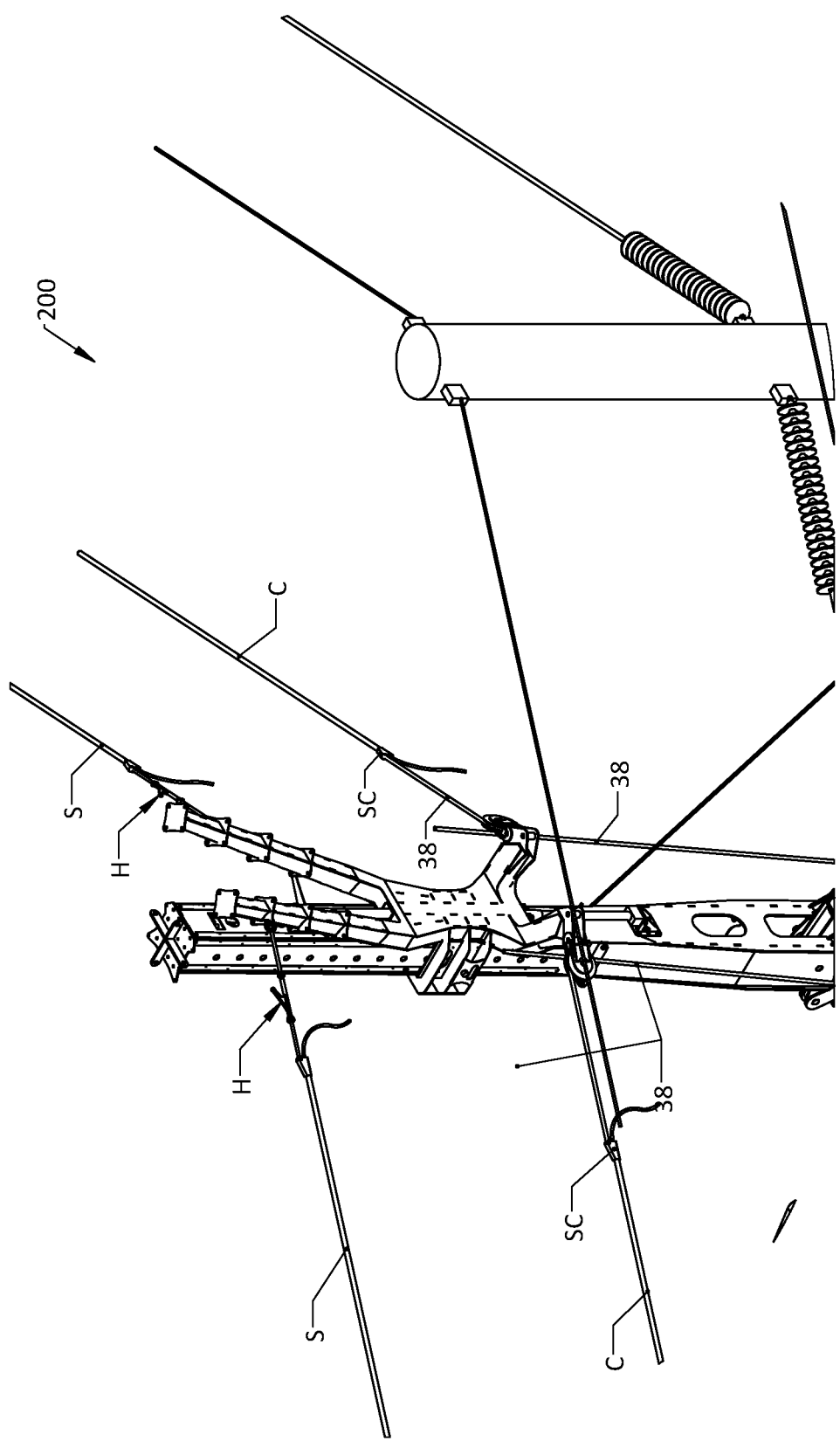
FIG. 36 is an enlarged, detail view of the area circled in FIG. 35.

FIGS. 35 and 36 illustrate that, once the conductors C and static lines S are held and supported by the winch column 10, as in FIGS. 33 and 34, the existing pole may be removed (as represented by the "stump" 102 in FIG. 35). After replacement with a new pole (not shown), typically in or very close to the same place, personnel guide the conductors C (with strain insulators) to their proper places on the new pole (while the winch cables are being let-out by remote control of the winches 34), reconnect the conductors C on the new pole, and disconnect the winch cables 38 from the conductors C, whereafter the winch cables can be reeled in again by remote control. Similarly, personnel guide the static lines to, and recommend them to, the new pole, letting out the manual hoist and then disconnecting the hoist assembly H from the static lines.

Figure 37:
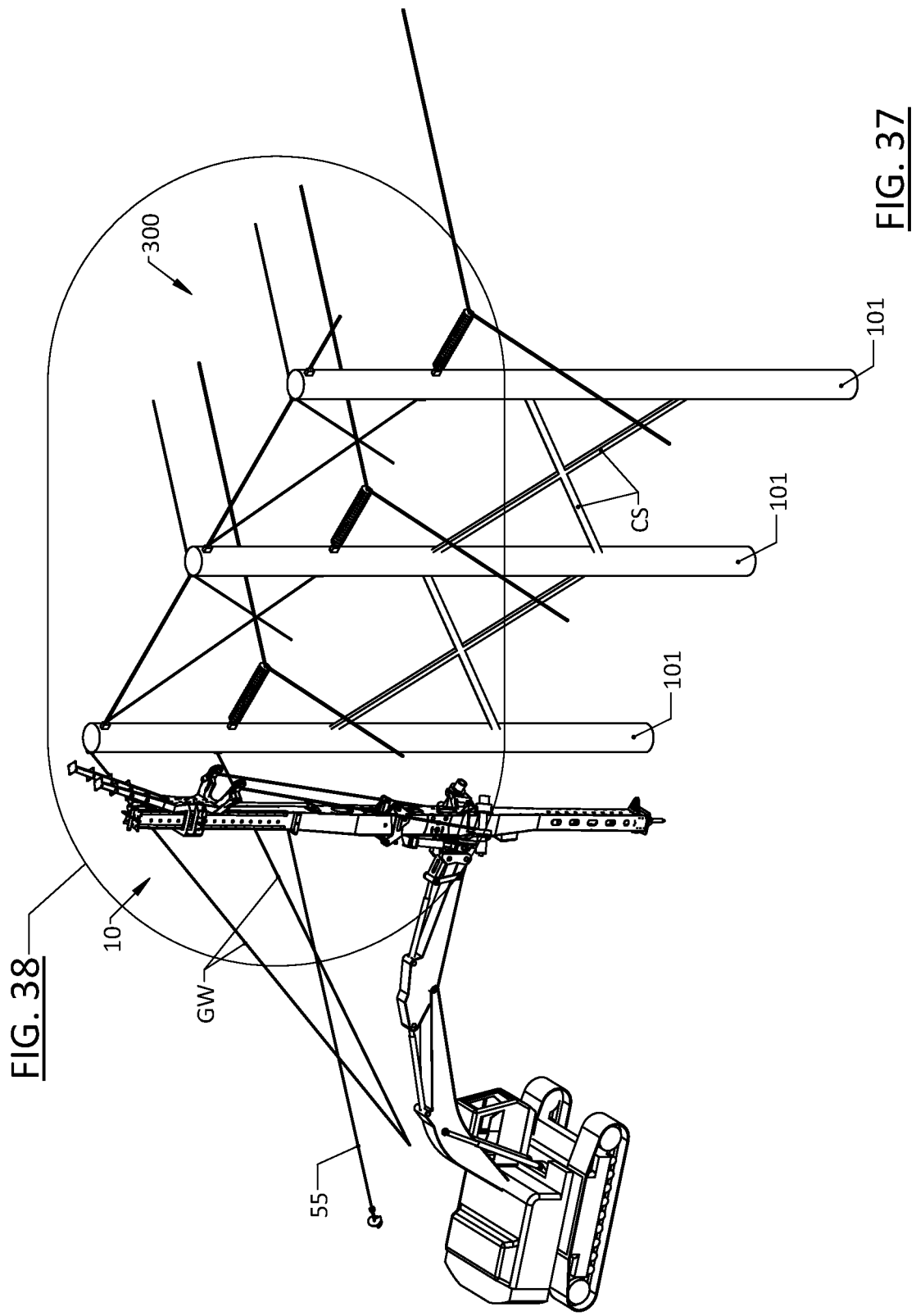
FIG. 37 is a right side perspective view of one embodiment of a winch pole and process for handling and supporting conductors and static lines of multiple power poles of a "running angle" style of pole assembly, wherein this figure shows a method step wherein the winch pole is installed in place but not yet connected to conductors or static lines.
Figure 38:
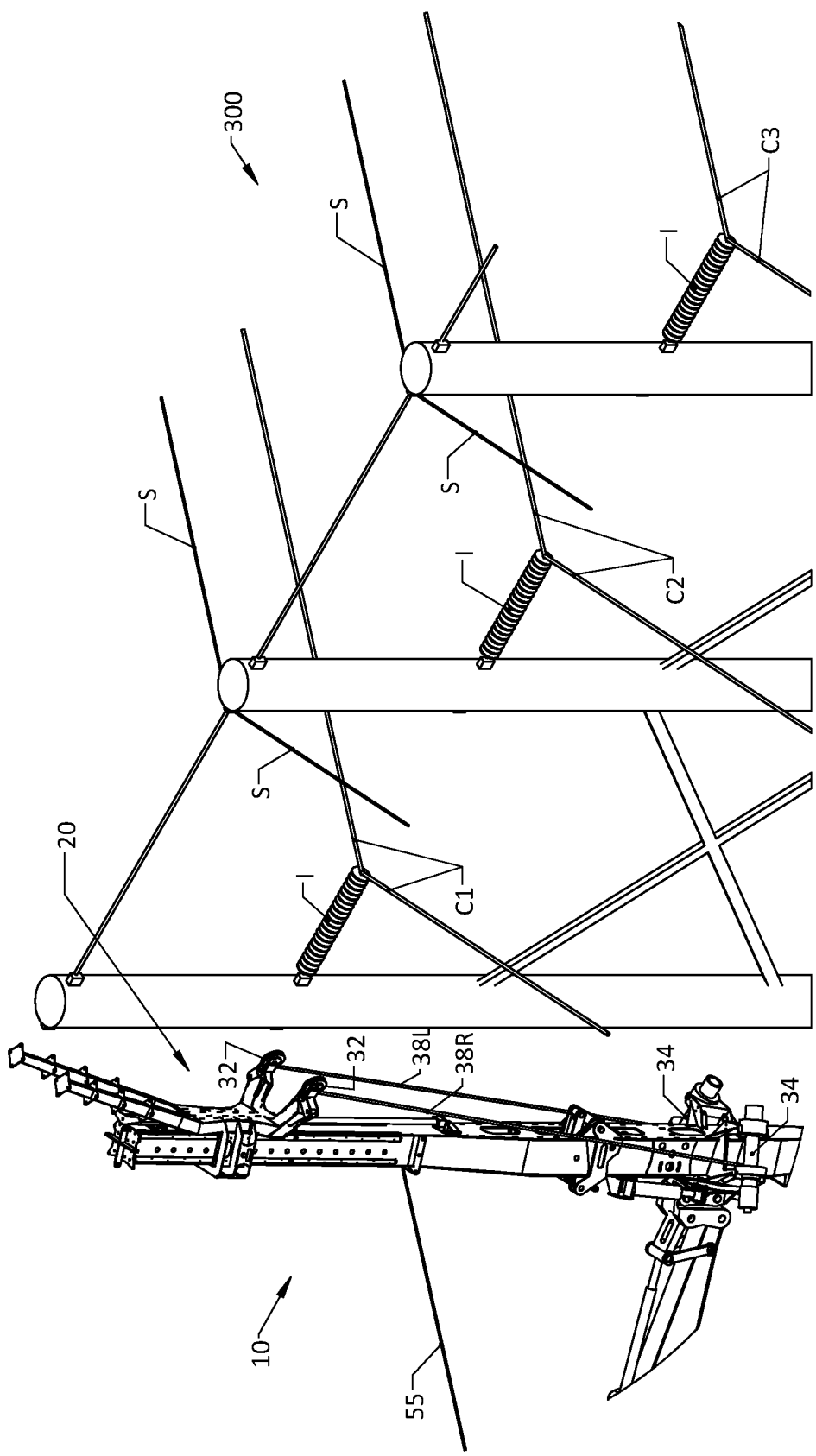
FIG. 38 is an enlarged detail view of the area circled in FIG. 37.

FIGS. 37-42 illustrate certain embodiments of the winch column and process 300 for use with a power transmission line of the "running angle" or "running angle conductor" type. This type of power line structure comprises an existing pole assembly of three poles 101 all in need of replacement, connected and strengthened by cross-struts CS. Each conductor C of this assembly (in the Figures, C1, C2, C3 for the left, middle, and right poles 101) is connected to its respective pole 101 by a single horizontal strain insulator I, wherein the (uncut) conductors "runs past" the pole and the insulator I, bending at an obtuse angle, for example of 135-170 degrees, at the insulator I. Thus, in some instances only one mechanical connection of each conductor C is made to a respective pole, as is known in the field of power line systems and the two portions of the conductor extend away from the insulator at said obtuse angle to each other. In other instances, all three conductors may be stacked on a single pole in a vertical configuration. FIG. 37 shows the winch column 10 installed, and held by the excavator E, adjacent to the existing pole assembly of three poles 101, all of which will be replaced in this process. In FIG. 37 and enlarged detail FIG. 38, the winch column 10 is installed and stabilized, similarly as explained earlier in this document for FIGS. 25-30 and FIGS. 31-36, adjacent to the far-left pole of the three existing poles to be replaced, but no connection has been made to the conductors C or the static lines S. In this process, however, a stabilizing guy wire 55 is added to the winch column device, by connecting the guy wire 55 to the upper main body, for example, at a bracket or other attachment. The other end of the guy wire is anchored to the ground behind the winch column 10, with this location on the opposite side of the column from the poles 101 and the conductors C being advantageous to counteract the tension of the conductors from all three poles in this process, as will be understood from FIGS. 39-42. In FIGS. 37 and 38, winch cables 38 are seen extending from the winches 34 upward along the upper main body to the sheaves 32, but the distal (outer) ends of the winch cables are at the sheaves 32 and not yet connected to any of the conductors C.

Figure 39:
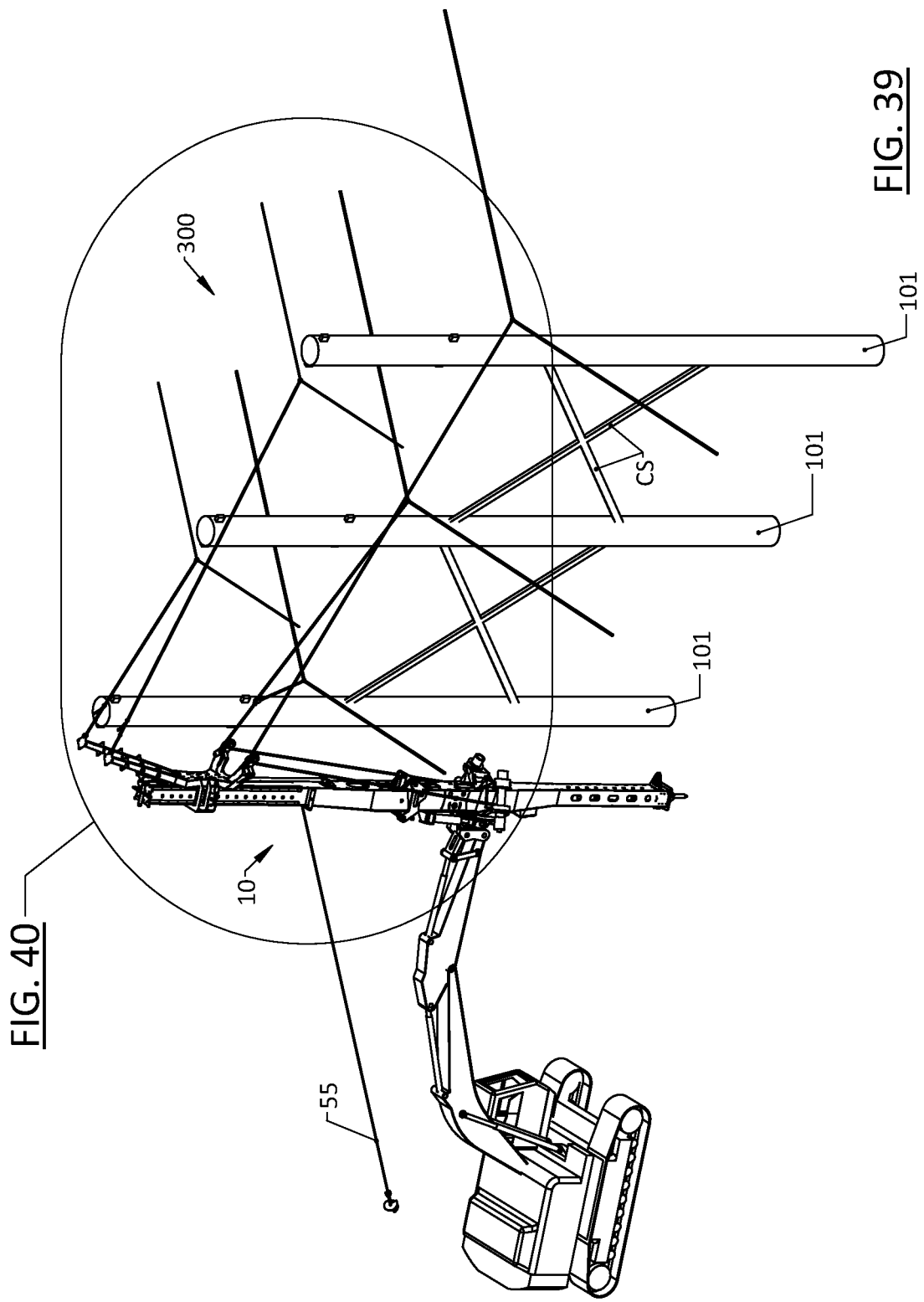
FIG. 39 is a right side perspective view of the continuing process of FIG. 37 wherein the winch system winch cables have been connected to, and have lifted, the conductors away from all of the three existing poles, and hoist lines have been connected to, and have lifted, the static lines away from two of the existing poles, to support the conductors and static lines separately from the existing pole for replacement of the three existing poles.

FIG. 39 and enlarged details FIGS. 40 and 40A-C show the winch column 10 holding and supporting the conductors C of all three poles 101, and the static lines S of the middle and the right poles, after their disconnection from the existing poles. The right winch cable 38R extends all the way to the far conductor C3 originally supported by the far-right pole. The left winch cable branches to extend to both the other conductors C2 and C1, by addition of an extra sheave or "evener" 32LX and extra winch cable 38LX. The left winch cable 38L extends to capture conductor C2, but the extra sheave 32LX splits off winch cable 38LX that extends to capture conductor C1. All three conductors C1, C2, C3 have been captured by the winch cables 38 by means of conventional suspension clamps SC or other connectors. Said capturing is done when the conductors are still supported on the existing poles, but the winch cables 38R, 38L, 38LX are then reeled-in to take-up the weight/tension of the conductors C, so that personnel (not shown) can disconnect all the conductors with the conductors being supported by the winch cables. Due to the weight/tension inherently of/on the disconnected conductors C1, C2, C3, the conductors will tend to move away from the existing poles. The winch cables may be reeled-in further to move the conductors away from the existing poles 101 to the positions shown in FIGS. 39, 40, and 40A-C, while maintaining the proper tension on, and level of, each of the conductors C. Maintaining the proper tension is done by monitoring the tension sensors 33 in the right and left winch sheaves 32. Although it would be possible to add a load sensor at sheave/evener block 32LX, it is not necessary in many embodiments, as the tension on each conductor (C1 and C2) can be derived by dividing by two the tension on the load sensor of the left lower arm sheave (from 38L). and adjusting tension by use of the winches 34. Applicant has determined that this process may be performed with the branched winch cable but with only the two winches 34. As will be understood, the branched winch cable apparatus for connecting to two of the three conductors could be provided in the right rather than the left winch cable.

FIGS. 39, 40, and 40A-C show the static lines S, which are provided as horizontal static lines from two of the three poles (middle and the far-right poles), captured and supported on shelves 29 of the arms 28 after being captured by a manual hoist assembly H as described above. Said connection to the pin point 29, capture of the static line S, and manual hoist operation to take-up slack in the static line after disconnection from the pole 100, are performed by personnel (not shown), to move the static line S away from the pole 100 toward the respective arm 28 to maintain the static line S at the proper level.

Figure 41:
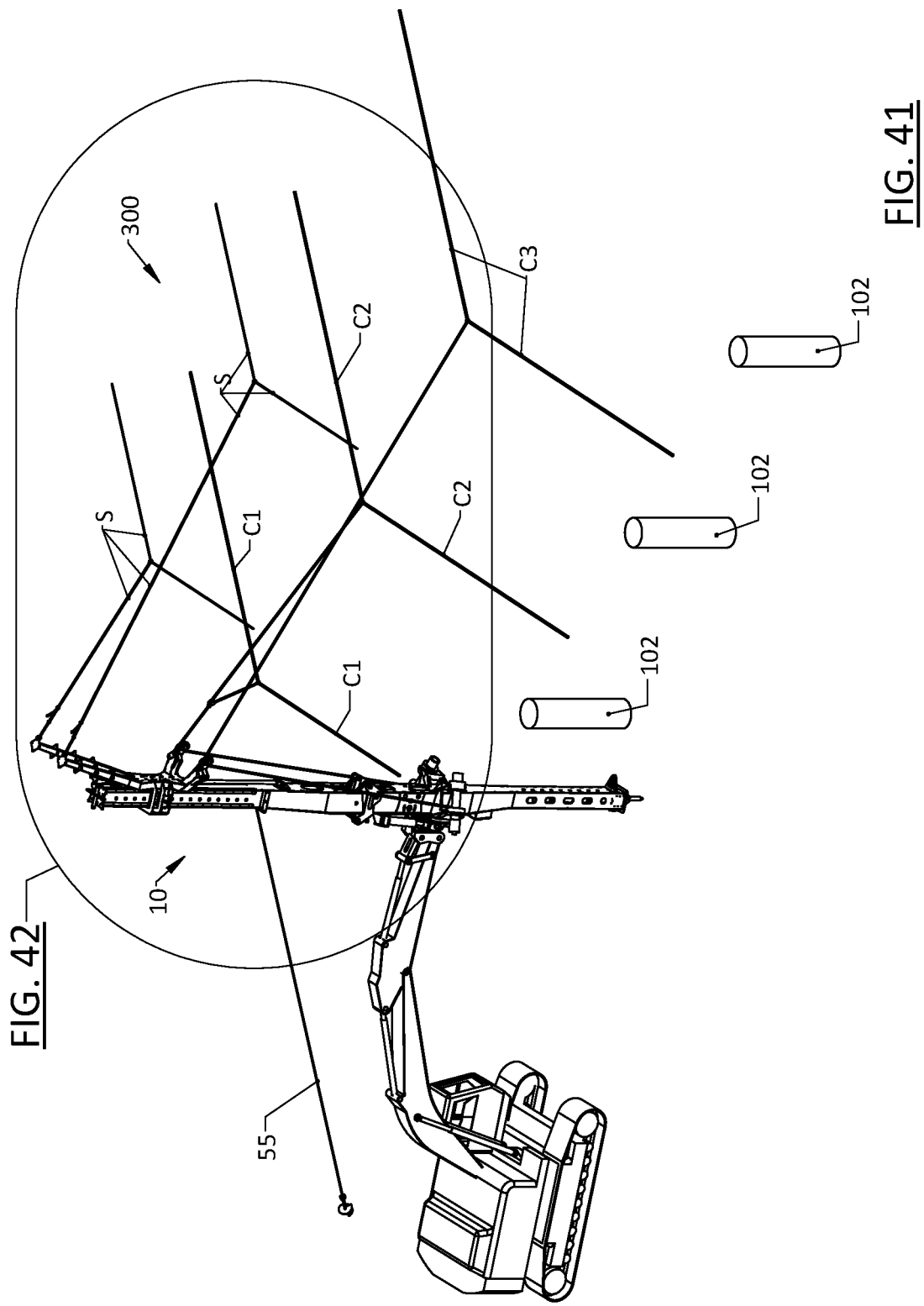
FIG. 41 is the same as FIG. 39, except that the three existing poles are represented as stump to schematically indicate their removal, noting that certain embodiments will comprise complete removal of each of the existing poles.
Figure 42:
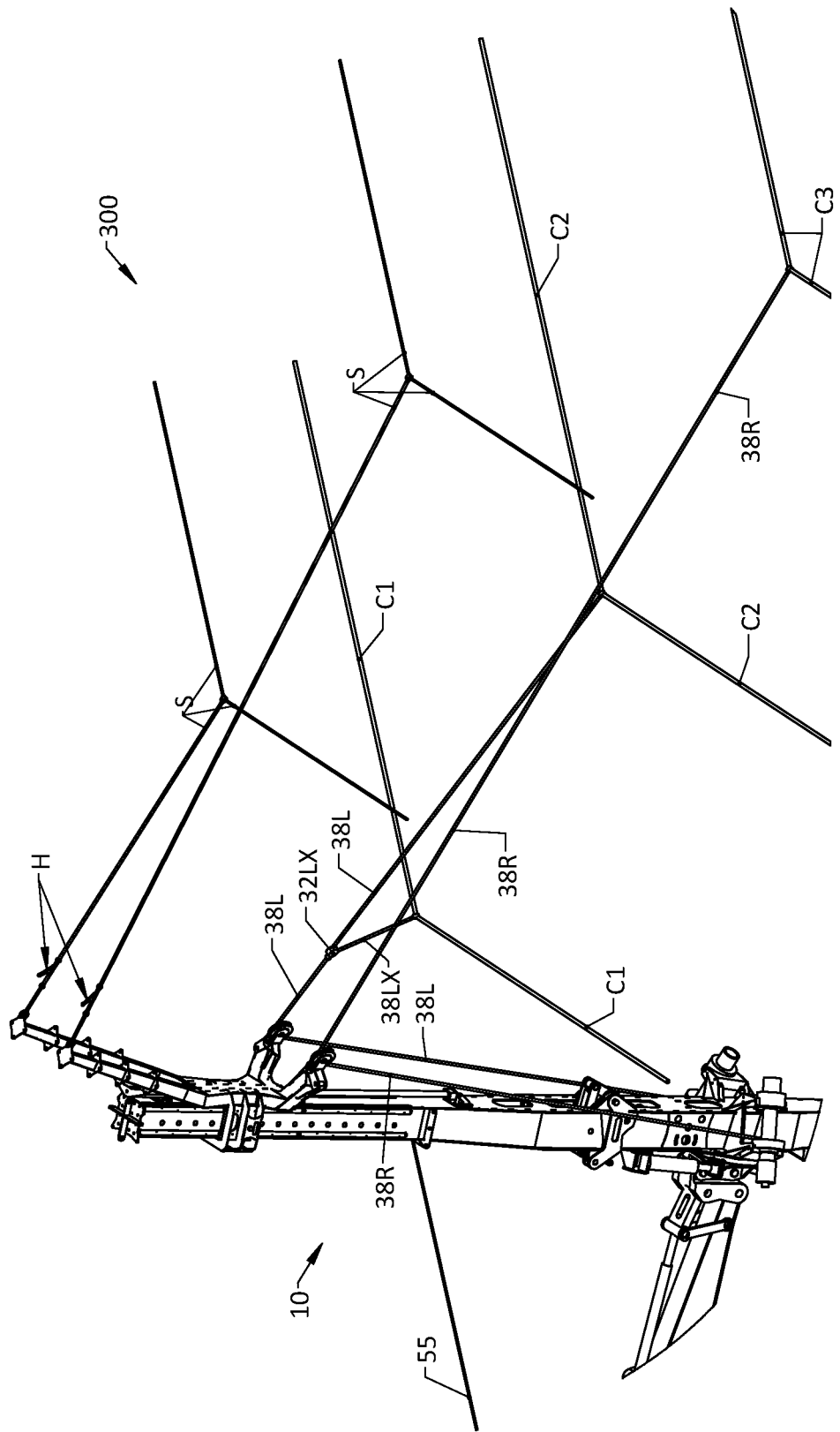
FIG. 42 is an enlarged detail view of the area circled area in FIG. 41.

FIGS. 41 and 42 illustrate that, once the conductors C and static lines S are held and supported by the winch column 10, all three existing poles may be removed (as schematically shown by the "stumps" 102 in FIG. 41).

After replacement with three new poles (not shown), typically in place of, or very close to, the stumps 102, personnel guide the conductors C (with strain insulators) to their proper places on the new poles (while the winch cables are being let-out by remote control of the winches 34), reconnect the conductors C on the new poles, and disconnect the winch cables 38 from the conductors C, whereafter the winch cables can be reeled in again by remote control. Also, personnel disconnect the hoist assembly from the shelves 29 or the static lines S from the hoist assembly H, and guide the static lines S back to the new poles for connection to the new poles.

Figure 40:
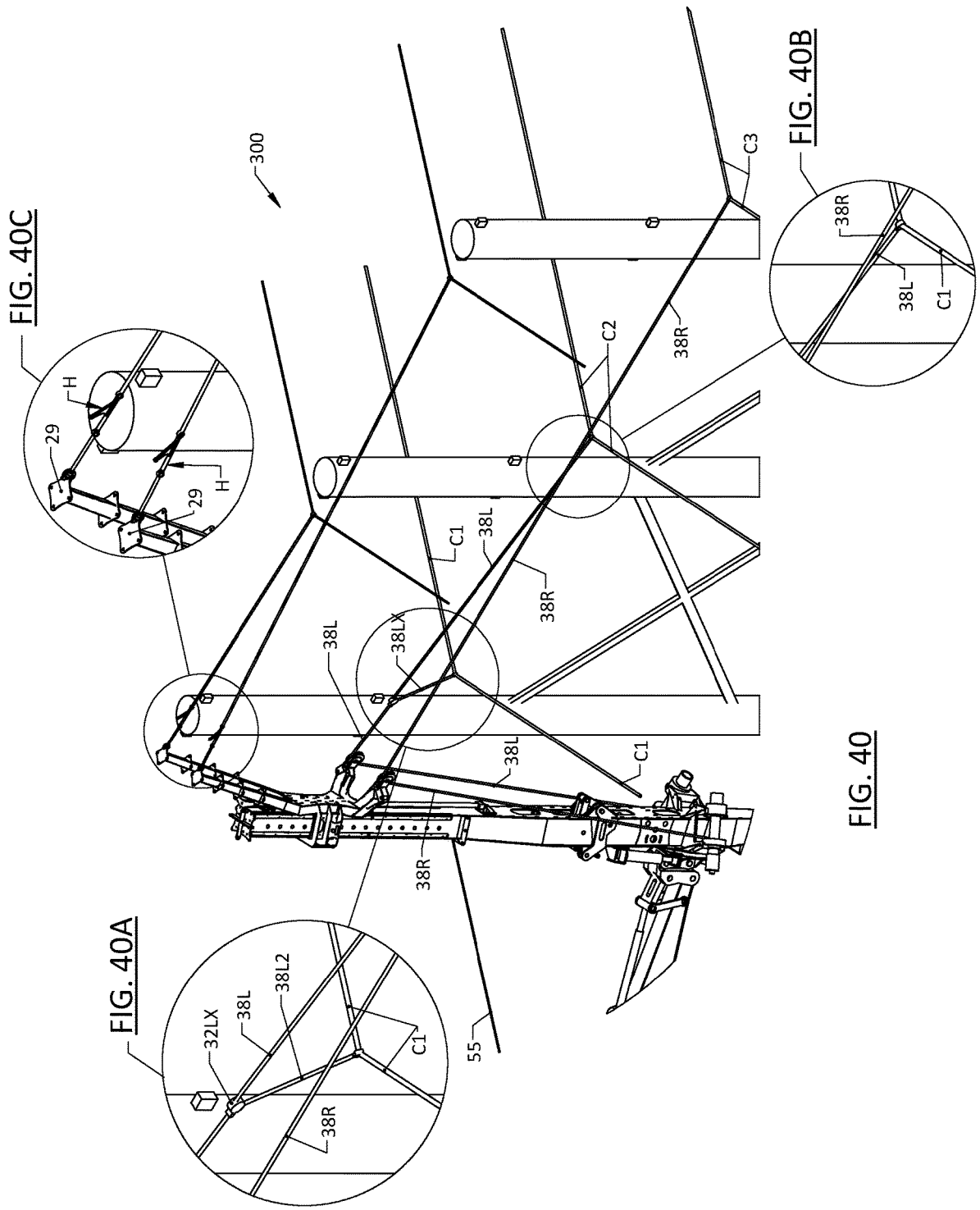
FIG. 40 is an enlarged detail view of the area circled in FIG. 39.

From this description and FIGS. 40-42, one may understand that certain embodiments of the winch column 10 and associated methods may be used to handle multiple conductors at the same time, for replacing multiple existing poles without moving the winch pole. This process allows the winch column 10 to stay in one place for all three pole replacements, and requires much less movement of equipment and personnel compared to conventional methods, resulting in safety, time and cost improvements.

One may understand from FIGS. 25-42 that certain embodiments of the winch column, the winch cabling, and the associated methods, may be adapted for various power line poles/structures, resulting in versatility and universality so that the invented equipment and methods may be used for many different power lines and at many different sites.

Further Comments Re Certain Embodiments of the Winch Column Device and Methods of Use:

The device hydraulically folds and unfolds for storage and or transportation on a trailer to and from jobsites. The fold and unfold functions are operated from a safe distance via the radio remote control, and, when the device is in the erected position, pneumatic pinning cylinders are deployed via the remote control, locking the device into the in-use position.

The winch column device is connected to a large hydraulic excavator via a quick connect coupler, wherein the quick connector coupler is preferably the conventional coupler provided on such excavators. Connection to the hydraulic excavator allows the excavator to lift the folded winch column device from a truck bed and thereafter to transport the device on the jobsite. The excavator also provides, hydraulic, electric and pneumatic power for unfolding, erection, and adjustment of the device in preparation for use, and for operation and stabilization of the device while in use.

The device quick coupler is mounted to a slew ring on the device that allows the device to be rotated by up to 20 degrees in either direction allowing for plumbing of the device to a vertical position when the excavator is sitting on an un-level surface.

The device main body is constructed with an extension on the bottom end that allows for extension or retraction of the extension to assist in adjusting the winch connection points to the proper height. When set at the chosen height of extension, the lower extension is then locked into place by pneumatically operated pinning cylinders that are locked and unlocked by the device's radio remote controller. Further, a stabilizing spike on the bottom of the extension is forced into the earth to assist in stabilization of the device, by the excavator pushing downward on the device via the quick coupler connection to the device. The device is also constructed with strategically placed guying points that allow for use of safety cables or guy wires (for "guying") to provide stabilization when uneven tensions are applied.

Thus, while the deployment and use of the device is temporary in a given location and adjacent to a given pole/structure, the device is stable and not likely to shift or move away from the pole/structure in any direction or amount, until the job is done and the device disconnected from the conductors may be shortened, lifted from the ground (spike pulled up from the ground) and moved to another pole/structure or folded and moved to a truck for transport or storage.

Therefore, certain embodiments of the device may be described as an integrated mechanism for removing conductor loads from a power-transmission pole/structure and temporarily supporting those conductors "in place" or "in-situ", in both directions simultaneously (the conductors extending in two directions from any given pole), that is, in a location and orientation very similar to their original position and orientation on the pole/structure to be repaired or replaced. The term "integrated" is used herein because the elements to provide capture/attachment to the conductor(s)/line(s), to take on the load of the tensioned conductor(s)/line(s), to manipulate and move the conductor(s)/line(s), and then to reverse the process, are all contained in one winch column device, and that device is workable and effective with only, or substantially only, an excavator, a cherry picker or other personnel lift to take personnel to the level of the conductors and the static lines, and optionally one or two safety cables from the device to the ground. This way, the conductors are kept at or within a few vertical feet of their original, in-use (operational) height above the ground, and are moved horizontally only several feet away from their original, in-use position and are supported under the same or similar tension as when in their original position. Tension measurements may be made and monitored to ensure a safe and effective support of the conductors during the pole/structure replacement/repair, and also when the conductors are replaced on the replaced/repairs pole/structure and the load is thus transferred back to the replaced/repaired structure (the "permanent" or "new" structure). Measuring and maintaining conductor tensions/loads can be very important, for example, because the tensions/loads can be great and there can be substantial tension differential between the two sides of a double dead-end structure, for example, resulting from spans of conductors in between pole assemblies of 300-5,000 feet. Thus, the equipment of the preferred embodiments is preferably installed temporarily, "universal" to most or all power poles or structures, portable, and reusable indefinitely.

The device main body is further constructed with a hydraulic extension on the upper end of the structure that allows for extension or retraction of the upper K-Frame by means of a hydraulic cylinder that is operated from the device's remote control. When set at the chosen height of frame-extension, the K-Frame is then locked into place by pneumatically operated pinning cylinders that are locked and unlocked from the device's remote controller.

The device K-Frame upper structure is designed to cradle around the pole allowing winch line connecting points to be positioned in-line with conductors or cable lines that are to be supported by the device. The K-Frame also includes additional connection points that allow for connecting additional conductors, shield wires or overhead optical ground wires to the device with manual hoists allowing for connecting both conductors and overhead shield or optical ground wire to the device in two different directions at the same time. This allows to workers temporarily transfer all loads from an existing pole or structure to the device that temporarily supports these loads while repair or replacement is completed.

The device is equipped with hydraulic winches and winch lines that run through sheaves with load sensing pins that report tension loads back to the device remote control, for example with readout/indicators on a hand-held remote control console, and provide accurate load sensing tension read-outs on the remote controller's digital screen. This substantially improves worker safety and productivity by providing both hydraulic winch adjustment of conductor tensions and accurate tension information. On one of the structures replaced on a test project done by Applicant, workers were quickly able to determine that tensions on existing conductors running east from the structure were two times the tensions on the existing conductors running west from the structure. Tensions were approximately 8,000 lbs going west from the structure, and approximately 16,000 lbs going east from the structure. Given the ability to add stabilizing guys to the winch column device, the device was able to handle the tension differential of the two conductors and two overhead ground wires in opposing directions without any problem.

Conductor sag can be adjusted from/by the remote control by simply connecting the winch line/cable to the conductor and increasing the tension on the winches enough to allow for manually disconnecting the conductor from the power-line structure, then adjusting the conductor tension by measuring tension force being exerted on the conductors connected to their respective winches and reported on the remote control digital screen. Thus, the operator can simply increase or decrease conductor tensions from the remote controller.

Removing conductor tensions from a structure to allow for repair or replacement of the pole/structure or structural components may be accomplished by simply erecting the device, positioning it adjacent to the pole/structure, connecting the device winch lines to the conductors with conductor grips, taking the strain of the conductors via the hydraulic winch to support the conductors and allow for detaching them from the structure. Once the conductor/line loads are transferred to the winch column device in this manner, crews can then remove and replace the existing structure, then re-attach the conductor to the new structure and release the winches placing the strain of the conductors back onto the new pole/structure. Thus, the device and methods simplify the equipment and steps needed, by supporting the conductors/line "at" or very near" the pole/structure that is being replaced/repaired, and by operating substantially all of the steps by remote control of the structural elements of an excavator and a single column device.

The preferred winch column device is made of steel with a tensile strength of 90,000-120,000 PSI in order to provide the strength require to support the dynamic forces while remaining light enough for transport. In certain embodiments, the winch column is rated/capable of handling dynamic forces of up to 24,000 lbs as the dynamic forces resulting from the conductors may be great, for example, 5,000-20,000 lbs while the forces resulting from the static lines being minimal.

Certain embodiments of the device and methods result in reduced or no need for cranes and ground-equipment-based winches, reduced need for guy wires and no need for guy wires at great distances from the winch column, no need for digging or a drill to install the winch column. Certain embodiments of the device and methods result in the electrical conductors being entirely removed from existing pole(s), and no part of the existing pole(s) being connected to or handled by the device. Certain embodiments of the device may be connected and stabilized by a crane boom, rather than an excavator, and so the term "vehicle" here is intended to include various vehicles that can connect to, hold and stabilize the winch column in use.

Although this disclosed technology has been described above with reference to particular means, materials, and embodiments, it is to be understood that the disclosed technology is not limited to these disclosed particulars but extends instead to all equivalents within the scope of the following claims and extends to all methods using the disclosed embodiments and the claimed devices.

The invention claimed is:

1. A device for handling power transmission conductors and static lines each supported at a respective in-use position of an existing pole of a power line system, which existing pole is to be replaced or repaired, the device comprising:
   an elongated winch column having a main body with top end a bottom end and a longitudinal axis between the top end and bottom end, and right, left, front and rear sides, a coupler on the rear side between the top end and the bottom end for connection to a stabilizing vehicle that is on the ground, the main body being adapted to be orientated vertically adjacent to the existing pole with the bottom end anchored to the ground;
   a frame that is slidable relative to the main body to raise the frame upward toward the top end and lower the frame downward toward the coupler, the frame comprising right and left lower arms and right and left upper arms extending from the main body, each of the lower arms comprising a winch sheave receiving a winch cable extending from and controlled by a respective winch mounted on the main body, and each of the upper arms comprising multiple connection points; and
   the outer ends of the winch cables being for connection to one or more of said conductors for supporting the one or more conductors during disconnection of, and moving, the one or more conductors away from the existing pole, and the upper arm connection points being for connection to one or more of said static lines for supporting the one or more static lines during disconnection, and moving of, the one or more static lines away from the existing pole, for replacement or repair of the existing pole.

2. The device as in claim 1, wherein each winch cable is reeled-in by the respective winch for said for supporting the one or more conductors during disconnection of, and moving, the one or more conductors away from the existing pole.

3. The device as in claim 2, further comprising hoist systems between the one or more static lines and the upper arms, the hoist systems being taken-in to move the one or more static lines away from the existing pole and toward the main body.

4. The device as in claim 1, wherein the winch sheaves each comprise a load sensor for measuring conductor tension when the winch cables are supporting said at least one conductor.

5. The device as in claim 1, wherein the bottom end is anchored to the ground by the bottom end comprising a spike pushed into the ground.

6. The device as in claim 5, wherein the bottom end comprising an extension having a lowermost end that is the spike, the extension being longitudinally extendible downward and longitudinally retracted upward to lengthen and shorten the main body, respectively.

7. The device as in claim 6, wherein the winch column has a maximum length when the extension is extended downward and the frame is raised upward.

8. The device as in claim 6, wherein the extension is lowered by the extension being unlocked from the lower beam and the winch column being raised by the vehicle so that the extension slides downward to a desired position wherein the spike hits the ground, and by the extension being locked in said desired position by at least one pneumatic cylinder of the extension moving a pin from the extension through an aperture in the lower beam.

9. The device as in claim 1, wherein the main body comprises an upper beam to which the frame is slidably connected and a lower beam to which the extension is slidably connected,
   the upper beam and lower beam being connected at a hinge so that the upper arm is pivotal relative to the lower beam to fold the main body.

10. The device as in claim 9, wherein the upper arm is pivoted relative to the lower beam to fold the main body by remote control.

11. The device as in claim 9, wherein the frame is raised or lowered to a selected height above the ground by a hydraulic cylinder and locked at the selected height by at least one pneumatic cylinder moving a pin from the frame through an aperture in the upper beam.

12. The device as in claim 1, wherein a circular bearing connects said coupler to the main body so that the main body is tiltable relative to said coupler for adjusting the main body to be vertical when the vehicle is on sloped ground.

13. The device as in claim 12, wherein the main body is tilted relative to said coupler by remote control.

14. The device as in claim 1, wherein the frame is raised and lowered and the winches are controlled by remote control.

15. A winch column system for supporting power transmission lines and static lines during repair or replacement of a power line existing pole, the winch column having a longitudinal axis, a front side, rear side, and right and left sides, the winch column system comprising:
   a winch column main body comprising a lower beam adapted to be connected to a vehicle and held by the vehicle to be vertically adjacent to the existing pole, an upper beam, and a hinge connecting the lower beam and upper beam and being adapted for pivoting the upper beam to be parallel to the lower beam in a winch column in-use configuration, and to be folded to be side-by-side with the lower beam in a winch column transport configuration;
   wherein, when the winch column is in the in-use configuration:
   a frame is slidable up and down the upper beam, and is lockable in multiple positions on the upper beam, wherein the frame comprises lower arms extending forward and each having a sheave receiving a winch cable controlled by a winch mounted on the main body, and upper arms extending upward and each having multiple connection points;
   wherein the winch cable of each of the lower arms is adapted for connection to a power transmission conductor, for supporting the conductor upon disconnection of the conductor from the existing pole, and moving of the conductor away from the existing pole and toward the main body, wherein each sheave comprises a load sensor for sensing the tension on the conductor; and
   wherein the upper arms are each adapted to connect to one of the static lines for supporting the static lines, by hoist systems being attached to a selected one of the multiple connection points on each of the upper arms and being connected to one of the static lines;

wherein, when the conductors and the static lines are disconnected from the existing pole, the winch cables in the sheaves of the lower arms and the hoist systems connected to the upper arms support, and hold at a distance from the existing pole, the conductors and the static lines, respectively, so that the existing pole can be repairs or replaced.

16. The system of claim 15, wherein the lower beam comprises a pointed spike stabilizes the main body by the spike extending into the ground.

17. The system of claim 15 that comprises only one of said winch columns and the frame of the one winch column supports all the conductors and all the static lines of the existing pole upon disconnection of the conductors and static lines form the existing pole.

18. The system of claim 15 that comprises only one of said winch columns and the frame of the one winch column supports all the conductors and all the static lines of an assembly of multiple of the existing poles.

19. The system of claim 15 comprising remote control of the pivoting of the upper beam, and the sliding of the frame up and down the upper beam.

20. The system of claim 15 comprising an extension that is slidable up and down from a lower end of the lower beam and that is lockable at various amount of extension from the lower beam, for adjusting length of the winch column.

21. The system of claim 20, wherein length of the winch column is adjusted by sliding and locking the extension into a lowered extension position, and the frame is slid and locked in a raised frame position, so that the upper arms are at the level of the conductors on the existing pole and the hoist systems are at the level of the static lines on the existing pole, so that the winch cables and the hoist systems extend substantially horizontally from the winch column for connection of the winch cables to the conductors and connection of the hoist system to the static lines.

* * * * *